(12) United States Patent
Handa et al.

(10) Patent No.: US 7,954,117 B2
(45) Date of Patent: May 31, 2011

(54) DISK SELECTING DEVICE AND DISK DEVICE WITH A DRUM CAM TO SEPARATE DISKS

(75) Inventors: Hiroto Handa, Tokyo (JP); Akira Takahashi, Nagoya (JP)

(73) Assignee: Clarion Co., Ltd., Tokyo (JP)

( * ) Notice: Subject to any disclaimer, the term of this patent is extended or adjusted under 35 U.S.C. 154(b) by 553 days.

(21) Appl. No.: 10/594,650

(22) PCT Filed: Mar. 31, 2005

(86) PCT No.: PCT/JP2005/006379
§ 371 (c)(1), (2), (4) Date: Jul. 25, 2008

(87) PCT Pub. No.: WO2005/096295
PCT Pub. Date: Oct. 13, 2005

(65) Prior Publication Data
US 2008/0282274 A1    Nov. 13, 2008

(30) Foreign Application Priority Data

Mar. 31, 2004 (JP) .................................. 2004-108193
Mar. 31, 2004 (JP) .................................. 2004-108216
Mar. 31, 2004 (JP) .................................. 2004-108226

(51) Int. Cl.
G11B 17/03      (2006.01)

(52) U.S. Cl. ........................................................ 720/614

(58) Field of Classification Search ............... 369/30.78; 720/615, 622, 614
See application file for complete search history.

(56) References Cited

U.S. PATENT DOCUMENTS

| 6,262,952 B1 | 7/2001 | Takai |
| 6,295,268 B1 | 9/2001 | Nakamichi |
| 6,744,704 B1 | 6/2004 | Funaya et al. |
| 2004/0057349 A1 | 3/2004 | Nishida et al. |

FOREIGN PATENT DOCUMENTS

| EP | 1 041 552 | 10/2000 |
| JP | 06-036437 | 2/1994 |
| JP | 09-198766 | 7/1997 |
| JP | 10-003733 | 1/1998 |
| JP | 11-232753 | 8/1999 |
| JP | 11-306637 | 11/1999 |
| JP | 2000-195134 | 7/2000 |
| JP | 2000-285565 | 10/2000 |
| JP | 2004063017 | 2/2004 |
| JP | 2004-108193 | 10/2005 |
| JP | 2004-108216 | 10/2005 |
| JP | 2004-108226 | 10/2005 |
| WO | WO 2005093743 A1 * | 10/2005 |

* cited by examiner

Primary Examiner — David D Davis

(57) ABSTRACT

A disk selecting device for storing a plurality of disks that can be separated to provide a space for receiving a disk drive unit to play a selected disk within the disk selecting device. A plurality of trays are mounted within the disk selecting device including a drum cam that can be rotated by a drum gear driven by a drive mechanism so that a disk selecting cam groove does not contact those trays that do not contain the disk to be selected for playing whereby a sufficient space is provided to drive the selected disk.

16 Claims, 33 Drawing Sheets

*FIG.9*
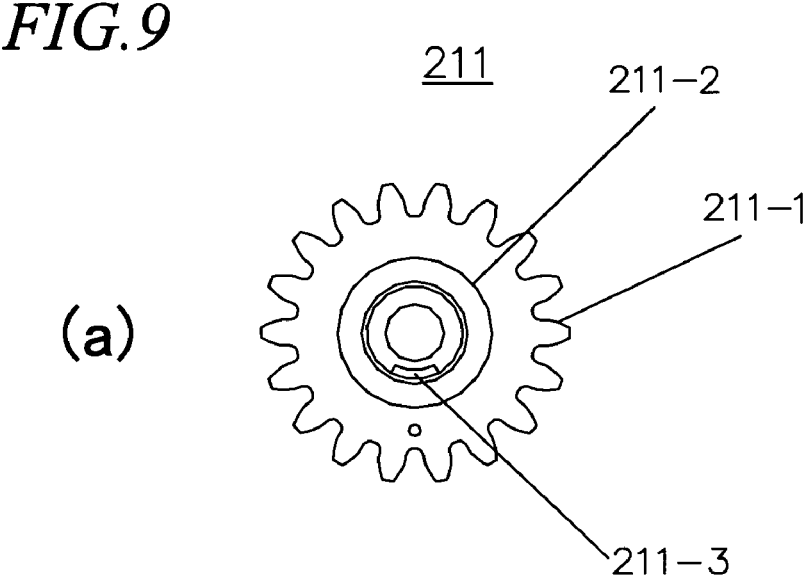
(a)
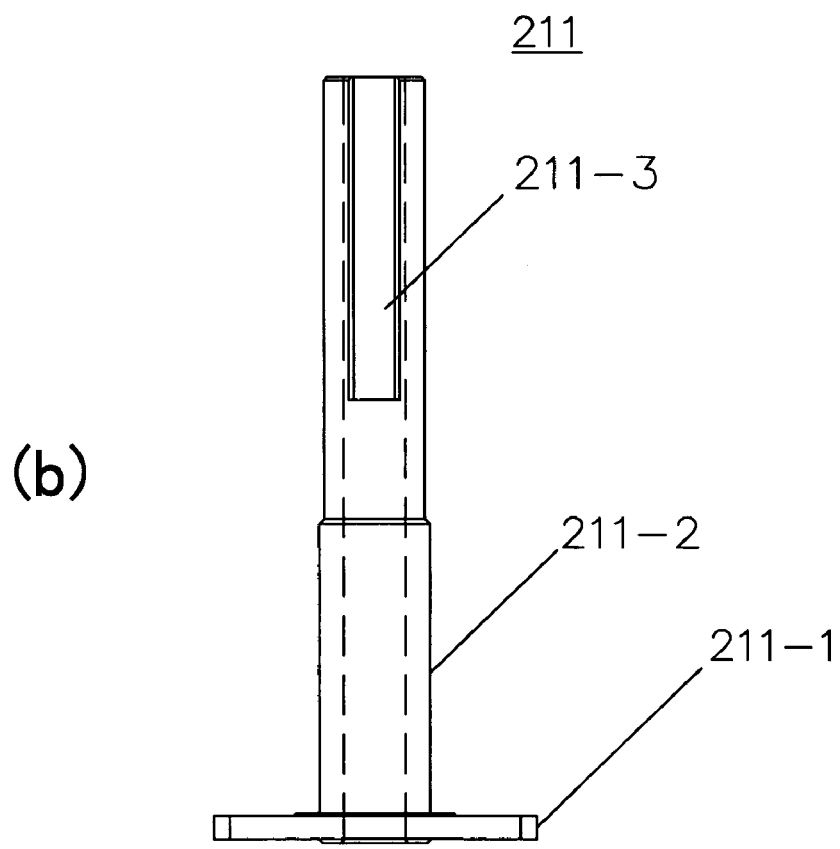
(b)

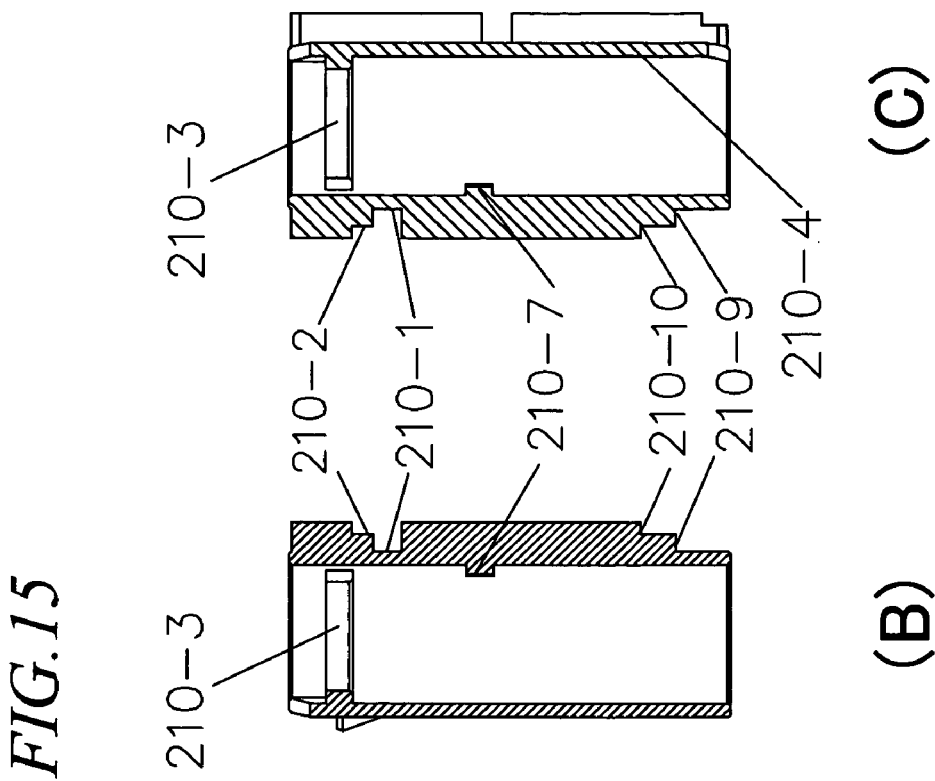
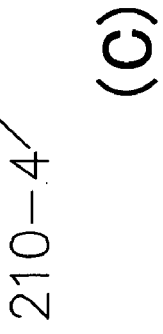
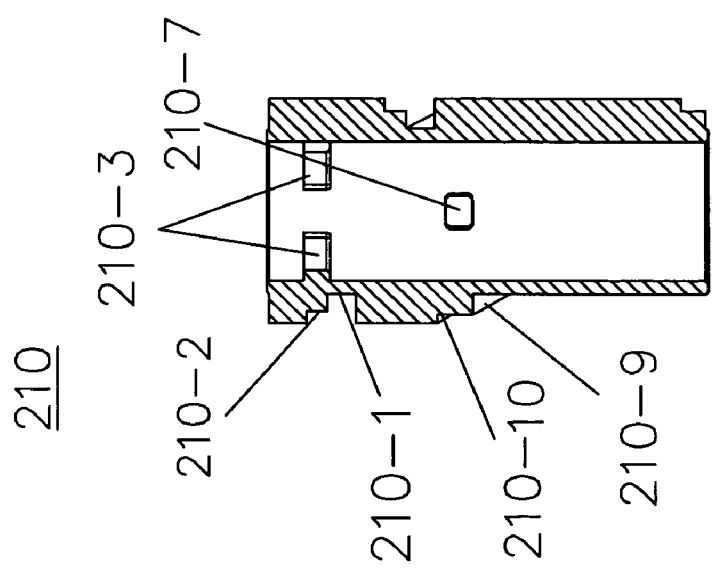
FIG. 15

FIG.20
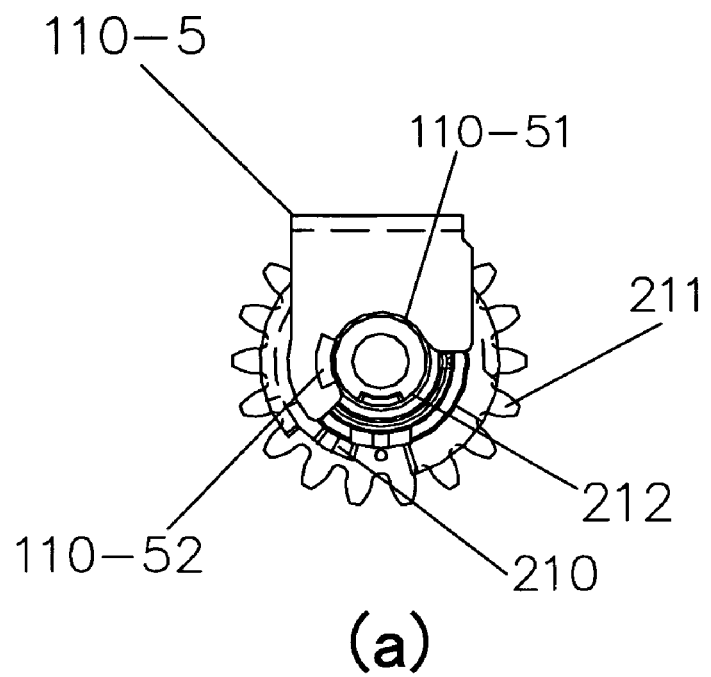
(a)
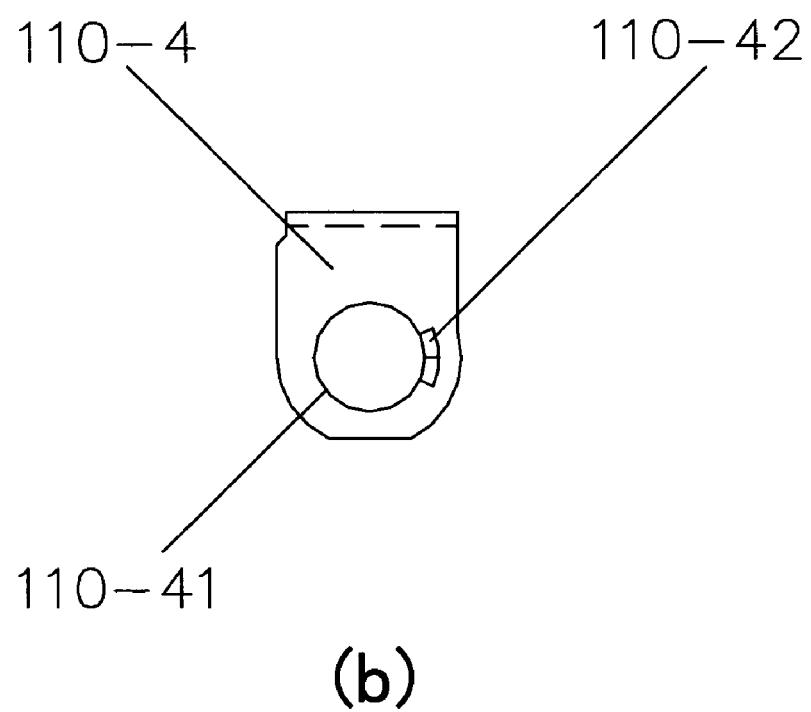
(b)

FIG.21
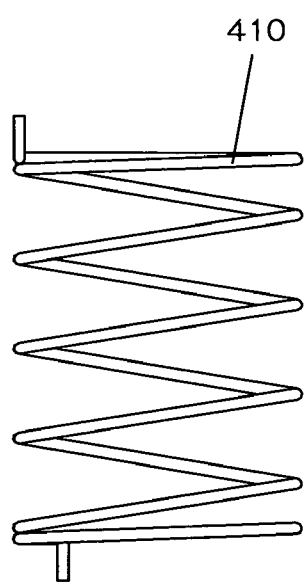
(a)
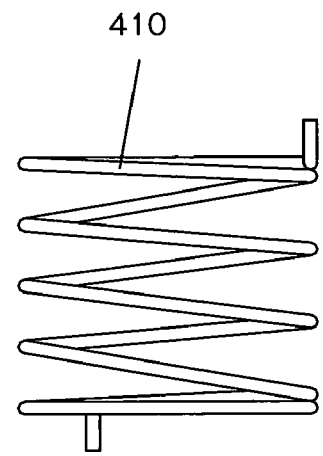
(b)

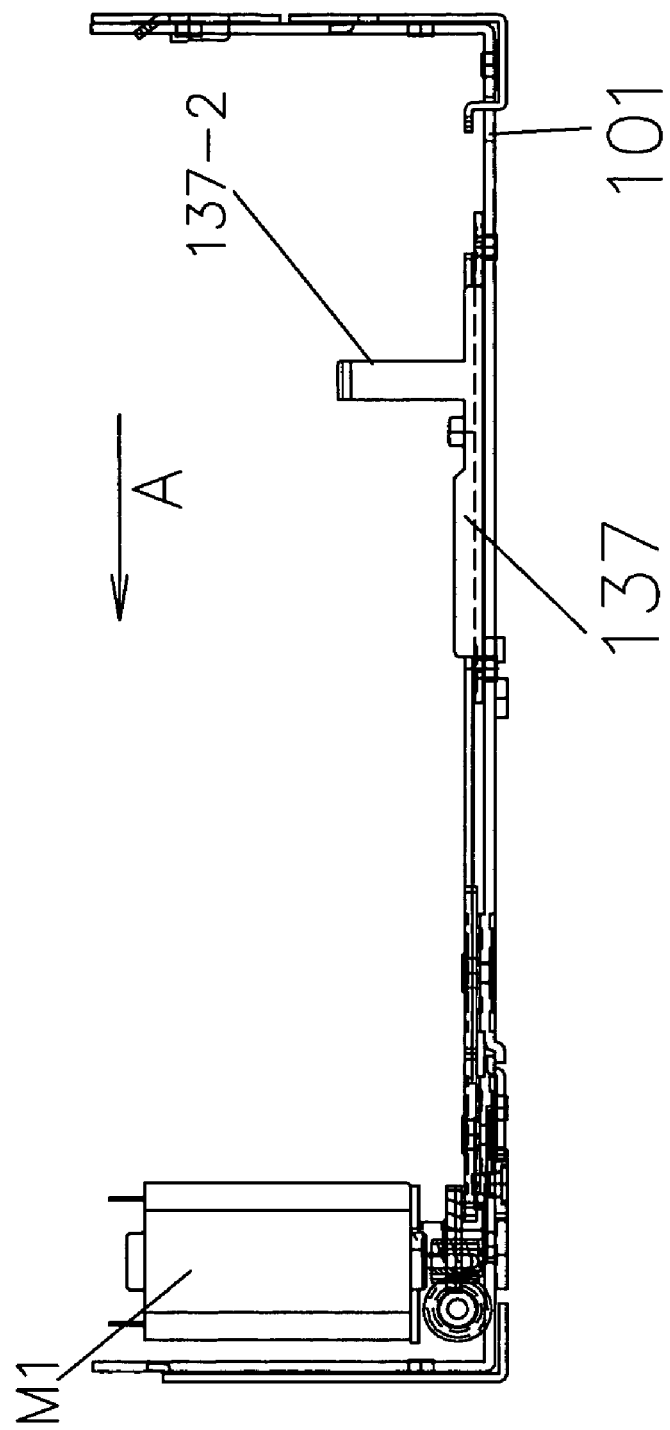

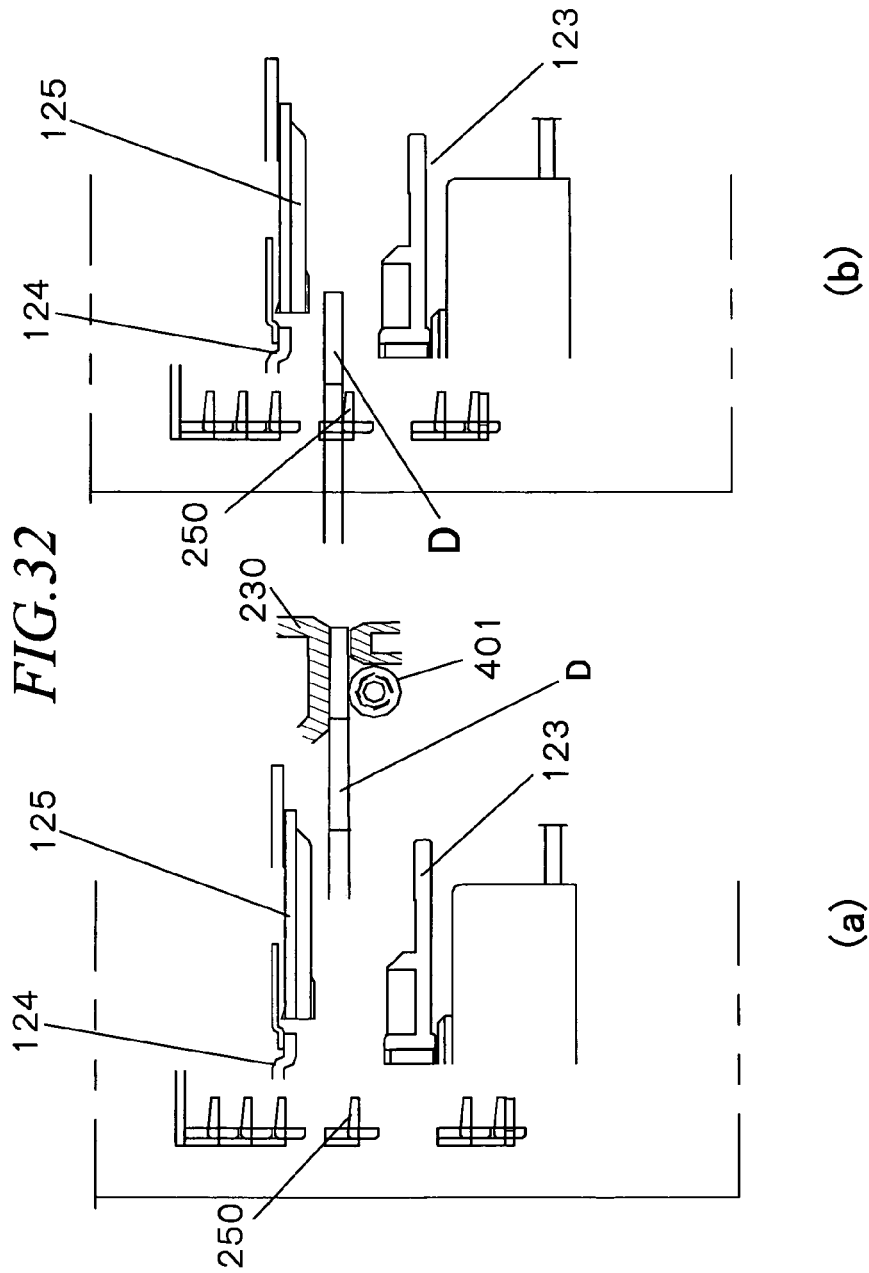

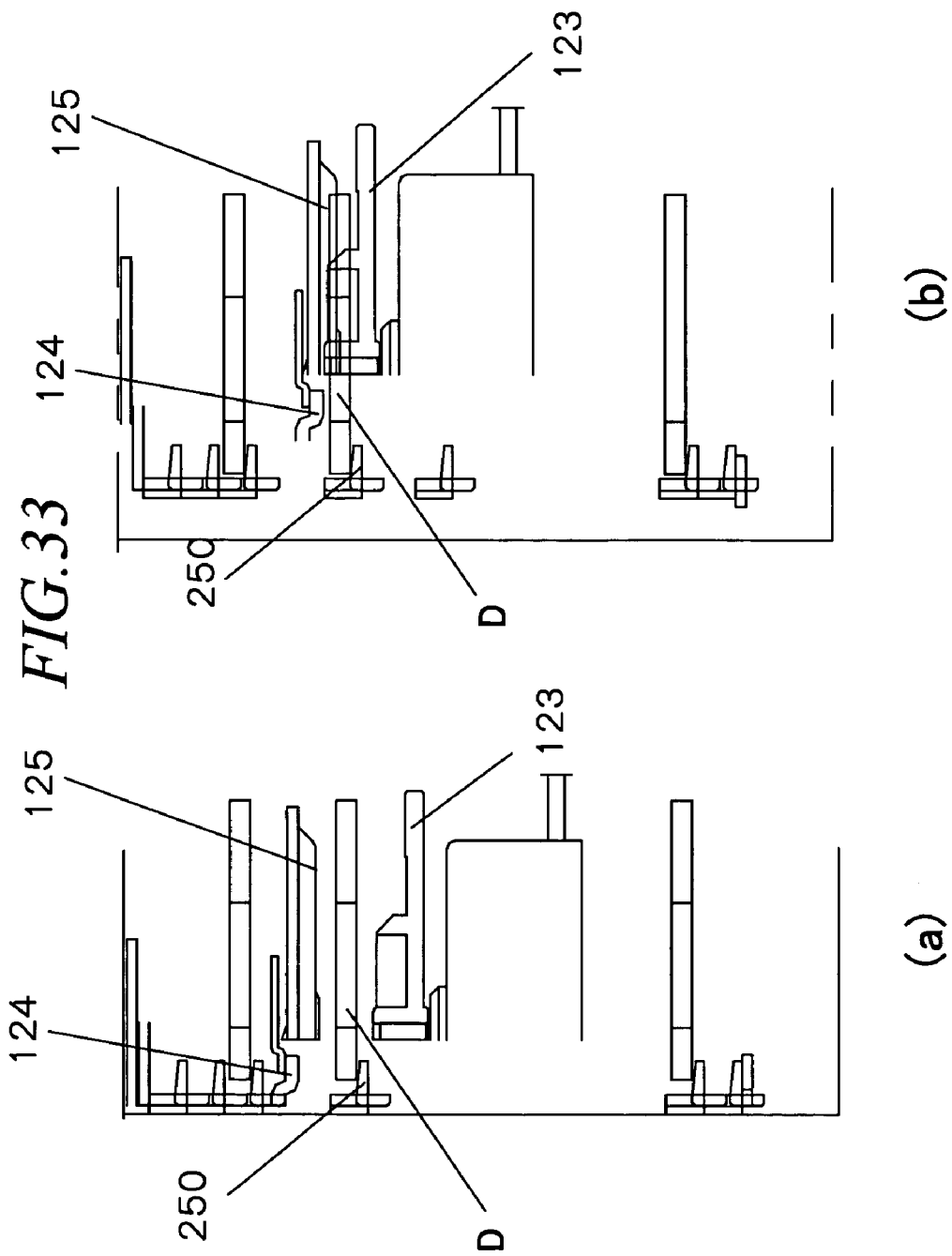

DISK SELECTING DEVICE AND DISK DEVICE WITH A DRUM CAM TO SEPARATE DISKS

TECHNICAL FIELD

The present invention relates to a disk selecting device for selecting a desired disk from a plurality of disk holding sections, and particularly to the improvement of a disk selecting device and disk device which, when playing a disk, can move the disk holding sections to form a space for inserting a drive unit thereto to play the disk.

BACKGROUND ART

Conventionally, there has been widely used a disk device which is installed with a magazine for housing disks and in which a disk taken out from the magazine is automatically played. Such a disk device is excellent in operability since the disks do not have to be inserted or ejected one by one every time when playing the disk.

However, it is required that the magazine attached or detached with respect to the device be strong enough to protect a plurality of disks held therein when taking out the magazine to the outside. Therefore, the walls of the magazine main body are thick, and as a result the sizes of the magazine itself and the entire device for installing the magazine are large. Moreover, in order to take out a tray or the like holding the disks inside the magazine, a guiding groove and a rail section are provided on an inner face of a side wall of the magazine. By forming such a groove and rail section, the thickness of the magazine side wall further increases and the gap between each adjacent disk holder becomes wide, whereby the height of the magazine increases and the size of the device for installing the magazine also increases.

In addition, in order to take out a disk housed in the magazine and play the disk, it is necessary to provide a sufficient space in the device, thus the size of the device increases. Particularly, as in an on-board disk device or the like, in the case where a disk needs to be housed in a size of 180×50 (mm), which is called "DIN size", or a size of 180×100 (mm), which is called "double DIN size", small-size disk devices are highly demanded.

In order to deal with such demand, a disk device is developed in which a magazine is split, and a drive unit for playing a disk is provided in a space formed by splitting the magazine, so that the disk can be played without taking out the disk from the magazine (see Japanese Patent Application Laid-Open No. H11-232753, Japanese Patent Application Laid-Open No. H11-306637). Such disk device does not require a space for taking out and play a disk, thus the size of the entire device can be made small.

Furthermore, there is proposed a disk device, in which a detachable magazine is not used but a disk holding section (a tray or the like) capable of holding a plurality of disks is incorporated in a stacked fashion, and a disk inserted from a disk insertion opening is automatically housed in the disk holding section, and the housed disk can be automatically ejected. In such a disk device, an opening, a mechanism and the like coping with the thickness of the magazine or attachment of the magazine are not required, thus a small-size device can be realized. Particularly, in the invention disclosed in Japanese Patent Application Laid-Open No. 2000-195134, trays are provided on a top and bottom so that they can be withdrawn as with the abovementioned split magazine, and a drive unit is inserted into a space formed between the trays, whereby a disk can be played without taking it out. Accordingly, further reduction in size of the device can be achieved.

Incidentally, in the conventional disk device using the disk holding section such as a tray or the like as described above, the tray, drive unit, and disk insertion opening need to be moved relatively in order to position a disk to be played or inserted/ejected. As a mechanism used for such purpose, use of a camp late having a sloping or step-like cam is considered. For example, a chassis or the like having a pin inserted into the cam of the cam plate is caused to hold the entire trays, whereby the chassis and the trays are moved up or down to desired positions respectively in accordance with a slide movement of the cam plate.

On the other hand, in order to stably hold a disk on a turning table when playing the disk, it is preferred that an inner diameter of the disk be pressed against the turning table by means of a clamper so as to sandwich the disk. For this reason, when playing the disk, the trays have to be withdrawn from the top and bottom to secure a sufficient space. As a mechanism for withdrawing the trays, use of the cam plate having the sloping or step-like cam is considered as described above. However, since it is difficult to use one type of cam plate to realize a plurality of functions such as positioning and splitting the trays as described above, a plurality of types of cam plates are disposed separately.

However, each of these cam plates needs to secure a required slide stroke, thus the size of a required space increases and the degree of freedom for disposing other members is limited in order to prevent an interference between the sliding cam plates. Moreover, each of the flat cam plates has a large contact area contacting with other member, and has to be slid by relatively strong drive power, thus even if the position of the tray, which is the object of selection, and the position of the cam of the cam plate are misaligned due to vibration, the misaligned positions cannot be corrected in the middle of operation.

In the conventional disk device using the disk holding sections such as trays or the like as described above, it is preferred to configure a structure in which the disks are securely held by the trays when housing the disks and a disk is easily released from the trays when playing or inserting/ejecting the disk. For this reason, for example, a holding member for holding disks on the trays is biased in a disk holding direction by a biasing member such as a spring when housing the disks, and a mechanism is provided for displacing this holding member against the bias force of the biasing member when playing or inserting/ejecting a disk.

However, for example, in the case where excellent resistance to vibration is requested as in the on-board disk device, if a disk is held on the tray simply by means of the bias force of the biasing member only, the position of the holding member is changed when strong vibration or the like occurs, destabilizing the position of the disk. In order to deal with such problem, if a mechanism or the like for fixing the holding member is provided separately when housing the disks, the size of the required space increases.

Particularly, the device is made complex and large by providing and accordingly synchronizing a mechanism for selecting a tray on which a desired disk is held, a mechanism for displacing the holding member in order to release the disk when playing or inserting/ejecting the disk, and a mechanism for locking the holding member when housing the disk.

The present invention is contrived in order to resolve the problems of the conventional technology as described above, and an object of the present invention is to provide a disk selecting device and a disk device in which only a small space is necessary and which can reliably prevent an erroneous selection of a disk.

DISCLOSURE OF THE INVENTION

The present invention is a disk selecting device, comprising: a plurality of disk holding sections for holding a plurality of disks respectively; and a disk moving mechanism for separating a disk holding section, which is the object of selection, from other disk holding sections, wherein the disk moving mechanism comprises: an axis section which is provided in the vicinity of the disk holding sections and rotated by a drive mechanism; a cylindrical drum cam into which the axis section is inserted and which is rotated in accordance with the rotation of the axis section; a disk selecting cam which is formed on a periphery of the drum cam and leads the disk holding section, which is the object of selection, in a direction of separating the disk holding section from other disk holding sections; and a transmitting section which is provided between the axis section and the drum cam, permits the rotation of the drum cam so that the disk selecting cam is withdrawn from the disk holding sections which are not the object of selection, and transmits drive power from the axis section to the drum cam.

In the present invention described above, the cylindrical drum cam rotates and thereby a disk holding section is selected, thus only a small space is necessary and the degree of freedom for disposing the members is high, compared to a cam plate or the like in which securing of a slide stroke and interference between other members need to be considered. Further, when the disk selecting cam selects a disk holding section, even when the disk selecting cam contacts with the disk holding section which is not the object of selection, the transmitting member permits the rotation of the drum cam, thus the disk selecting cam can be withdrawn from the disk holding section which is not the object of selection, whereby erroneous selection is prevented.

In another embodiment, the disk selecting device comprises a first biasing member which biases the plurality of disk holding sections in a direction in which the holding sections are brought close to one another.

In the abovementioned embodiment, even if the positions of the disk holding sections are misaligned by vibration or the like, the first biasing member can return the disk holding sections to the regular positions thereof while the disk selecting cam is withdrawn.

In another embodiment, the transmitting section is a cylindrical drum sleeve into which the axis section is inserted so as to be able to move in an axial direction of the axis section, and the drum sleeve has a fixing section for fixing the drum cam to the axis section in accordance with the position of the movement of the drum sleeve, and a permitting section which can rotate the drum cam independently from the axis section.

In the abovementioned embodiment, the cylindrical drum sleeve disposed between the axis section and the drum cam can transmit the rotation of the axis section to the drum cam and can permit the rotation of the drum cam for avoiding an erroneous selection, thus only an extremely small space is necessary.

In another embodiment, the disk selecting device is provided with: a second biasing member which biases the drum sleeve to a fixing position at which the fixing section fixes the drum cam or a permitting position at which the permitting section permits the rotation of the drum cam; and a pressing section which presses the drum sleeve in a direction against the second biasing member in accordance with the position of rotation of the drum sleeve, and thereby switches between the fixing position and the permitting position.

In the abovementioned embodiment, by using a simple configuration of a combination of the second biasing member and the pressing member, the fixing position and the permitting position can be switched automatically in accordance with the position of drum sleeve rotating along with the drum cam.

In another embodiment, the second biasing member is a spring which is disposed between the drum cam and the drum sleeve and biases the drum cam and the drum sleeve in a direction in which the disk selecting cam contacts with the disk holding section which is the object of selection.

In the abovementioned embodiment, biasing the drum cam and biasing the drum sleeve are realized by means of the common second biasing member, thus the number of parts and the required spaces can be saved.

In another embodiment, the disk holding section comprises a holding arm which is provided displaceably between a closed position for contacting with a disk to hold the disk and an opened position for separating from the disk to release the disk, and a periphery of the drum cam is provided with: a disk selecting cam for leading the disk holding section, which is the object of selection, in a direction of separating the disk holding section from other disk holding sections; and an arm opening/closing cam which biases the holding arm in the disk holding section, which is the object of selection, to the opened position or the closed position.

In the abovementioned embodiment, since the drum cam is provided with the arm opening/closing cam which opens and closes the holding arm for holding the disks in the disk holding section, a simple structure with a small number of parts and required spaces can be realized.

In another embodiment, there is provided a biasing member, which biases the holding arm in a direction opposite to the biasing direction of the arm opening/closing cam.

In the abovementioned embodiment, the holding arm, which is released from the bias of the arm opening/closing cam, can be returned automatically to the opened position or closed position by the biasing member.

In another embodiment, the arm opening/closing cam is disposed in the vicinity of the disk selecting cam.

In the abovementioned embodiment, since the disk selecting cam and the arm opening/closing cam are adjacent to each other, positioning of the disk holding sections and holding or releasing of the disk using the disk selecting cam can be synchronized easily.

In another embodiment, the arm opening/closing cam comprises a step for switching between whether or not to bias the holding arm.

In the abovementioned embodiment, the arm opening/closing cam can be realized by forming the step on the drum cam, thus a simpler configuration can be obtained and the parts can be produced easily.

In another embodiment, the disk selecting cam and the arm opening/closing cam are two rows of grooves having different depths and provided in parallel with each other, and a groove end of the arm opening/closing cam is provided with the step.

In the abovementioned embodiment, the grooves which are formed on the drum cam move the disk holding sections up and down and open or close the holding arm, thus the disk holding sections and the holding arm are hardly affected by a vibration or the like.

In another embodiment, the disk holding sections are disposed in a stacked manner and are provided so as to be able to move up and down individually, and each disk holding section is provided with a holding arm capable of being displaced between a closed position for contacting with a disk to hold the disk and an opened position for separating from the disk to release the disk, and a regulating section which regulates displacement of the holding arm of an adjacent disk holding section.

In the abovementioned embodiment, the disk holding section itself is provided with the regulating section which regulates the displacement of the adjacent holding arm, thus the structure can be simplified, compared to the case where other lock mechanism or the like is provided.

In another embodiment, the holding arm is provided with a holding nib for holding an outer edge of the disk at the closed position, and the regulating section is a lock hole into which the holding nib is inserted.

In the abovementioned embodiment, when the holding arm is at the closed position, the rotation of the holding arm is regulated by the holding nib being inserted into the lock hole, thus displacement of the disk can be prevented with an extremely simple structure.

In another embodiment, the disk selecting device comprises a first biasing member which biases the plurality of disk holding sections in a direction in which the disk holding sections are brought close to one another.

In the abovementioned embodiment, when housing disks, the disk holding sections are automatically brought close to one another by the first biasing member, thus the holding nib enters the lock hole to automatically regulate the holding arm.

In another embodiment, the disk selecting device comprises a second biasing member which biases the holding arm to the closed position.

In the abovementioned embodiment, the holding arm releasing the disk or housing the disk can be automatically returned to the closed position by the second biasing member.

In another embodiment, the periphery of the drum cam is provided with a disk selecting cam for leading the disk holding section, which is the object of selection, in a direction of separating the disk holding section from other disk holding sections, and an arm opening/closing cam for biasing the holding arm in the disk holding section as the object of selection to an opened position or a closed position.

In the abovementioned embodiment, since the drum cam can move the disk holding section up and down and opens or closes the holding arm, a simple structure with a small number of parts and required spaces can be obtained.

In another embodiment, the plurality of disk holding sections are disposed in a stacked manner, and comprise: a drive unit which plays a disk released from the disk holding section, which is an object of selection; a drive moving mechanism which moves the drive unit to a space formed by separating the disk holding sections; and an elevating mechanism which moves at least the drum cam or disk holding section to a position at which the disk selecting cam and the disk holding section, which is the object of selection, are fitted with each other.

In the abovementioned embodiment, there is provided the disk selecting device in which an erroneous selection can be prevented with a small number of parts and required spaces and rotation and regulation of the holding arm for holding disks can be performed securely, thus a small disk device with high resistance to vibration can be realized. Therefore, for example, a device that is suitable for an on-board disk device can be configured.

According to the present invention described above, the disk selecting device and the disk device, which require only a small space and can prevent an erroneous selection, can be provided.

BRIEF DESCRIPTION OF THE DRAWINGS

FIG. 9a is a plan view showing a drum gear of the disk device shown in FIG. 1;

FIG. 9b is a side view showing the drum gear of the disk device shown in FIG. 1;

FIG. 15A is a cross-sectional view taken along a line A-A of the drum cam shown in FIG. 13;

FIG. 15B is a cross-sectional view taken along a line B-B of the drum cam shown in FIG. 13;

FIG. 15C is a cross-sectional view taken along a line C-C of the drum cam shown in FIG. 13;

FIG. 20a shows an upward bending section of the disk device shown in FIG. 1;

FIG. 20b shows a downward bending section of the disk device shown in FIG. 1;

FIG. 21a is a side view showing an uncompressed state of a spring formed between the drum sleeve and the drum cam shown in FIG. 18;

FIG. 21b is a side view showing a compressed state of the spring formed between the drum sleeve and the drum cam shown in FIG. 18;

FIG. 31 is a left side view showing the chassis and a slide plate of the disk device shown in FIG. 1;

FIG. 32a shows a state in which a disk of the disk device shown in FIG. 1 is inserted;

FIG. 32b is a state in which the disk of the disk device shown in FIG. 1 is pulled in;

FIG. 33a shows a state in which a clamper of the disk device shown in FIG. 1 is swung; and FIG. 33b shows a state in which a clamper of the disk device shown in FIG. 1 is clamped.

BEST MODE FOR CARRYING OUT THE INVENTION

Hereinafter, an embodiment ("present embodiment", hereinafter) of an on-board disk device to which the present invention is applied is described in detail with reference to the drawings. It should be noted that the disk holding sections correspond to the trays, the axis section corresponds to the drum gear, and the drive moving mechanism corresponds to the pick arm and a mechanism for rotating the pick arm, the disk holding sections, the axis section, and the drive moving mechanism being described in the claims. Furthermore, in the following descriptions of the drawings, the front face side of the disk device is the head side, the back face side of same is the rear side, and the vertical and longitudinal directions correspond to the directions viewed from the front face side of the disk device.

A. Entire Configuration

Figure 1:
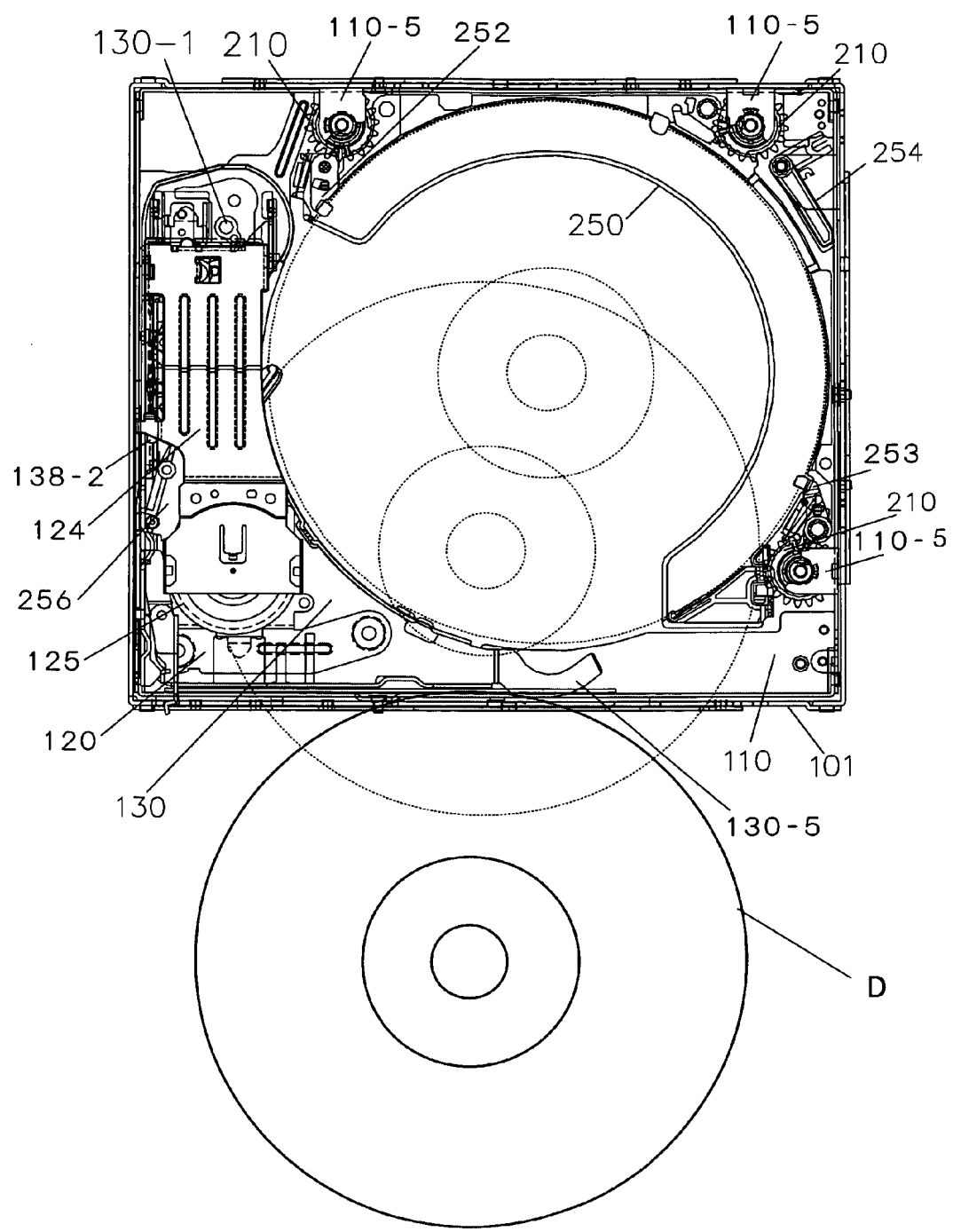
FIG. 1 is a plan view showing an embodiment of the disk device of the present invention.
Figure 2:
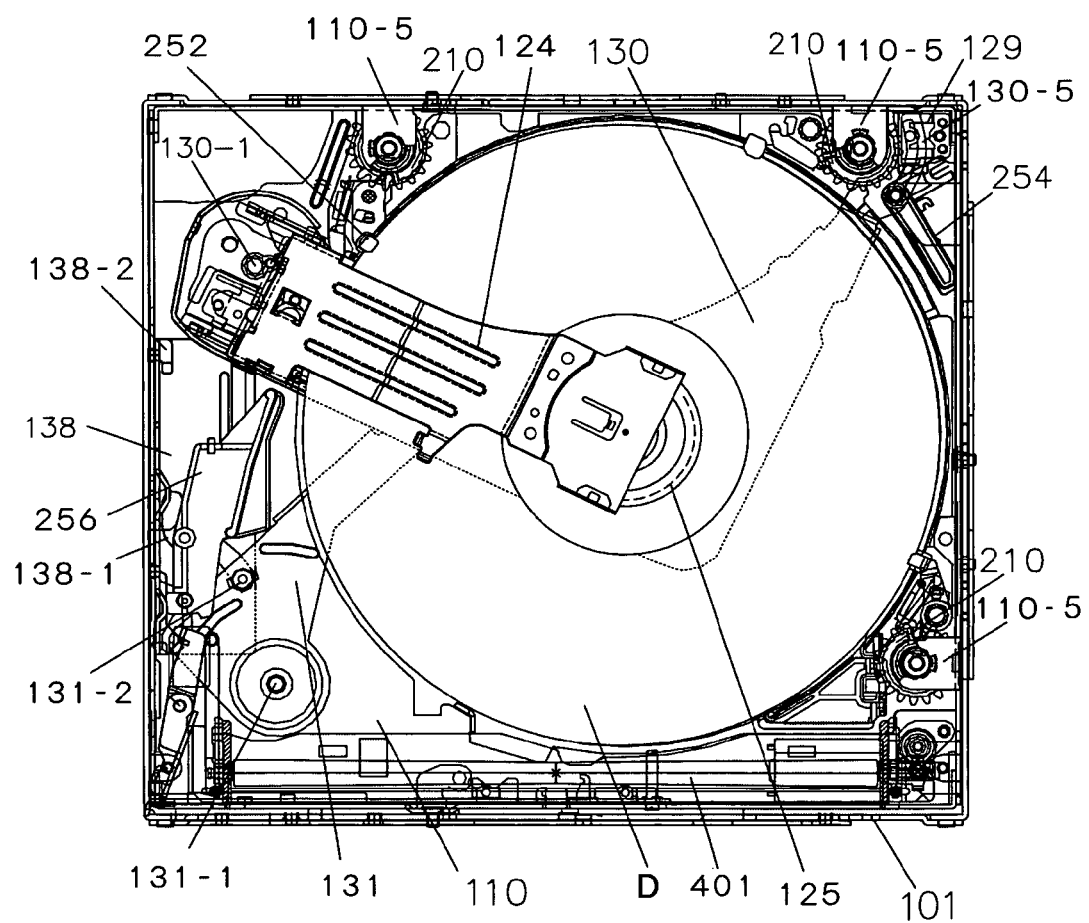
FIG. 2 is a plan view showing a state in which a disk shown in FIG. 1 is housed.

The present embodiment has the following schematic configurations as shown in FIG. 1 and FIG. 2:

(1) Trays 250 capable of holding disks D separately.

(2) A pick chassis 110 in which a plurality of trays 250 are stacked.

(3) A chassis 101 which is provided with the pick chassis 110 which can move up and down.

(4) A drum cam 210 which splits the trays 250 and moves them up and down.

(5) A pick arm 130 which is provided in the pick chassis 110 and swung to be inserted between the split trays 250.

(6) A drive chassis 120 which is disposed on the pick arm 130 and comprises a mechanism for playing the disks D.

It should be noted that the disk holding sections correspond to the trays 250, the drive moving mechanism corresponds to the pick arm 130 and a mechanism for rotating the pick arm 130, and the elevating mechanism corresponds to a mechanism for moving the pick chassis 110 up and down, the disk holding sections, the drive moving mechanism, and the elevating mechanism being described in the claims.

B. Configuration of Each Part

[1. Trays (FIGS. 3 through 8)]

Figure 3:
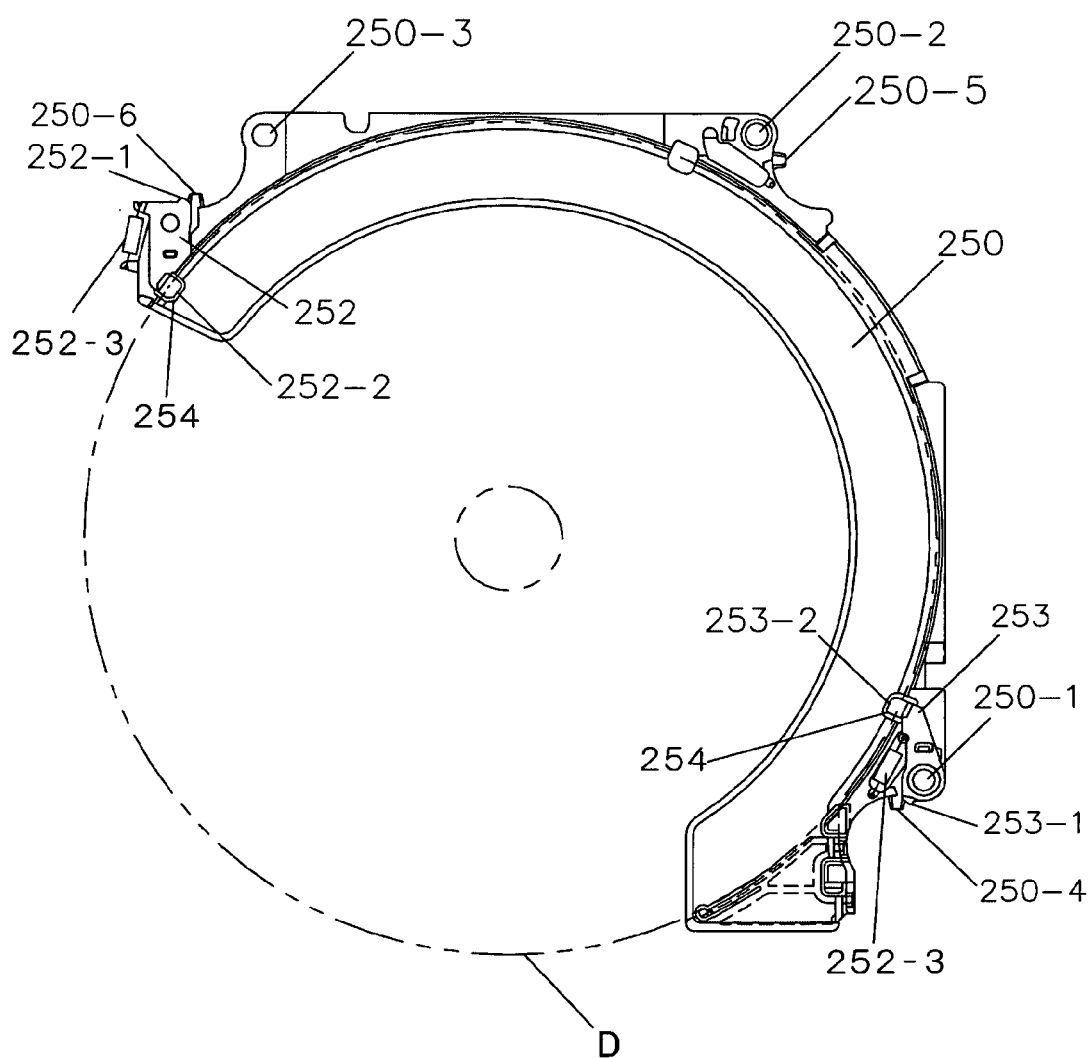
FIG. 3 is a plan view showing a tray of the disk device shown in FIG. 1.

Each of the trays 250 is a circular arc plate which follows an outer edge of the disk D as shown in FIG. 3. Holes 250-1, 2, 3 are formed in each tray 250. Three shafts (not shown), which are fixed upright to the chassis 101, are inserted into the holes 250-1, 2, 3 respectively, whereby the plurality of trays 250 are disposed in a stacked manner. Therefore, each tray 250 is provided in the vertical direction along each of the shafts so as to be able to elevate freely. Further, on three sections on the periphery of the tray 250, there are integrally formed nib sections 250-4, 5, 6 which are biased in the vertical direction and abut on a disk selecting cam groove 210-1 of the drum cam 210 described hereinafter.

At the left end of each tray 250, a holding arm 252 for holding a disk is rotatably supported by an axis integrated with the tray 250. In the vicinity of the right end of the tray 250 as well, a holding arm 253 in the same shape is rotatably supported by the axis integrated with the tray 250. Holding nibs 252-2, 253-2 in substantially L shape for supporting the outer edge of the disk D between trays 250 are formed in the holding arms 252, 253 respectively, and the holding arms 252, 253 are biased by springs 252-3, 253-3 in a direction in which the holding nibs 252-2, 253-2 hold the disk D.

Figure 4:
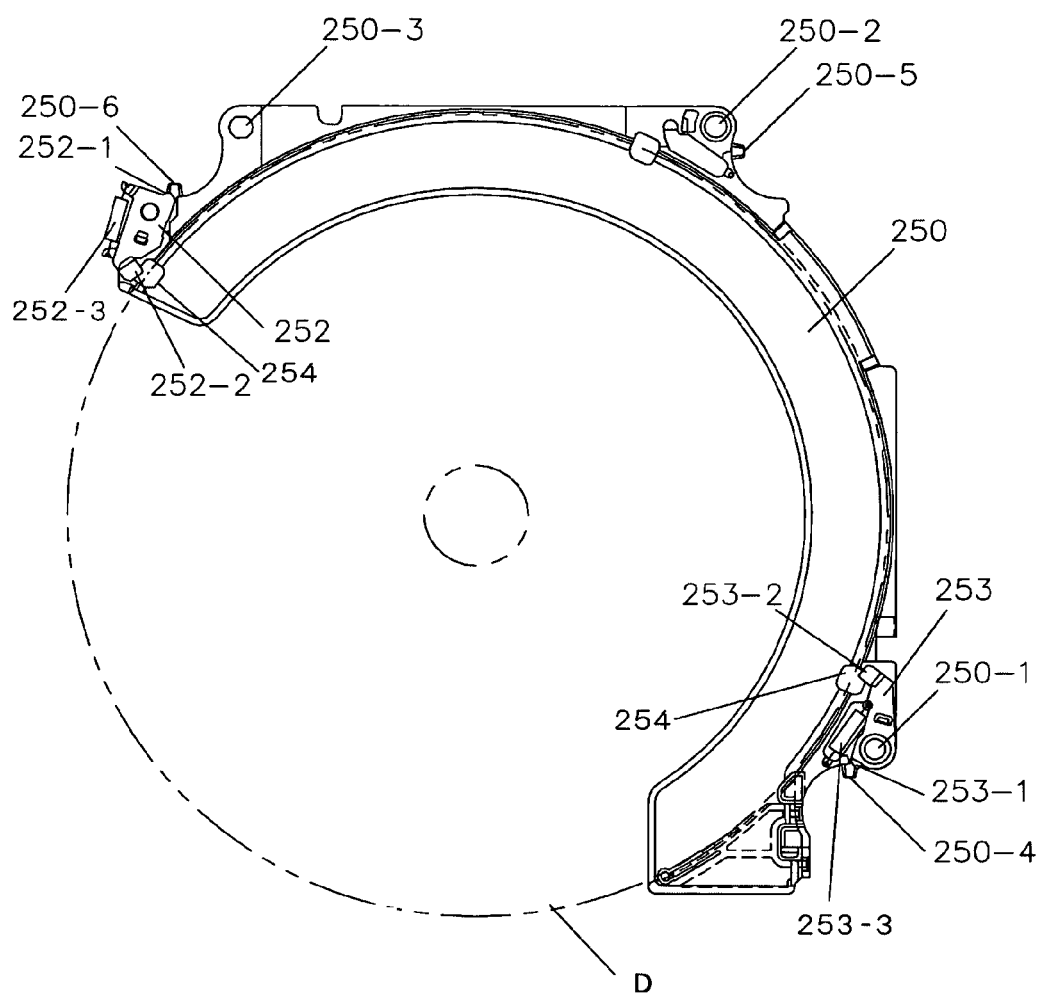
FIG. 4 is a plan view showing a state in which the disk in a holding arm of the tray shown in FIG. 3 is released.
Figure 5:
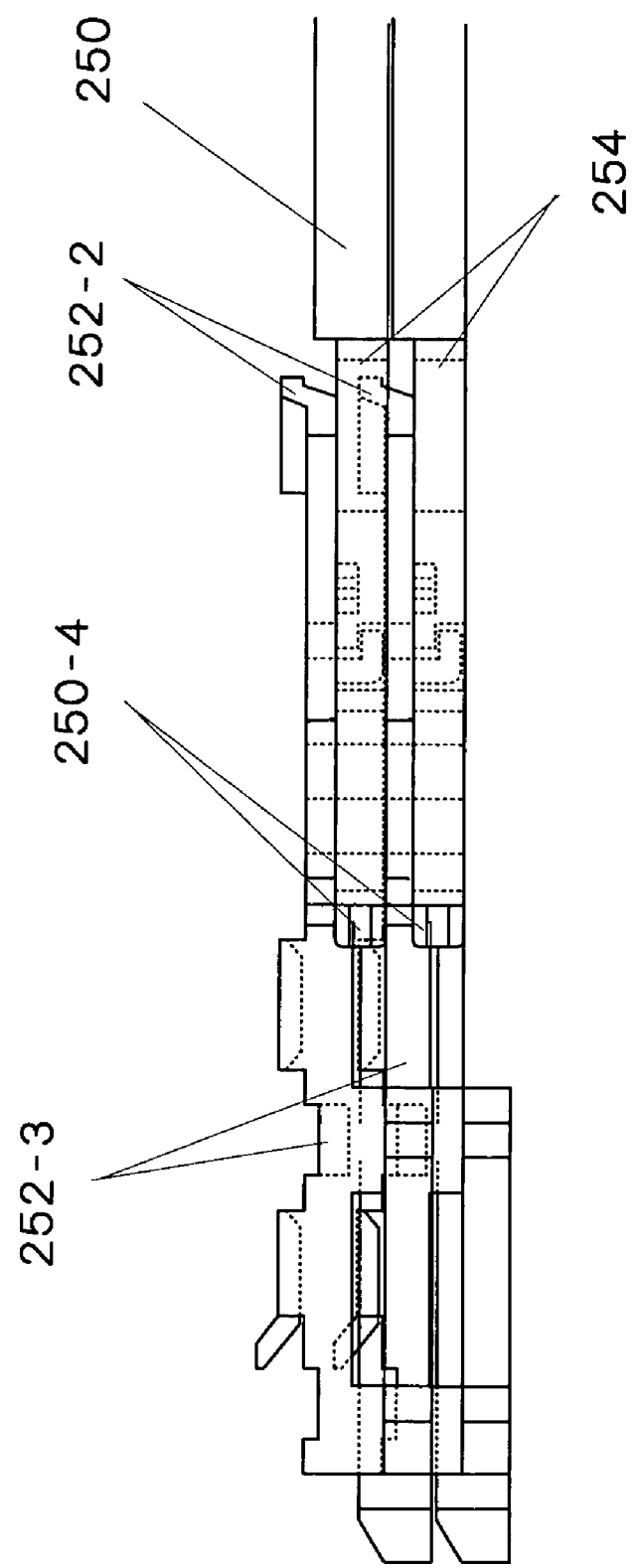
FIG. 5 is a partial side view showing a state in which the tray shown in FIG. 3 is stacked.

Furthermore, protruding sections 252-1, 253-1, which abut on an arm opening/closing cam groove 210-2 formed on the drum cam 210 described hereinafter, are integrally formed in the holding arms 252, 253 respectively. Accordingly, as shown in FIG. 4, due to rotation of the drum cam 210, the protruding sections 252-1, 253-1 are biased by the action of a step on the arm opening/closing cam groove 210-2, and the holding arms 252, 253 are rotated against the bias force of the springs 252-3, 253-3, whereby the holding nibs 252-2, 253-2 release the disk D. Moreover, as shown in FIG. 5, on each tray 250, there are formed lock holes 254 for regulating rotation of the holding arms 252, 253 by means of the holding nibs 252-2, 253-2 of an adjacent tray 250 being inserted into the lock holes 254.

Figure 6:
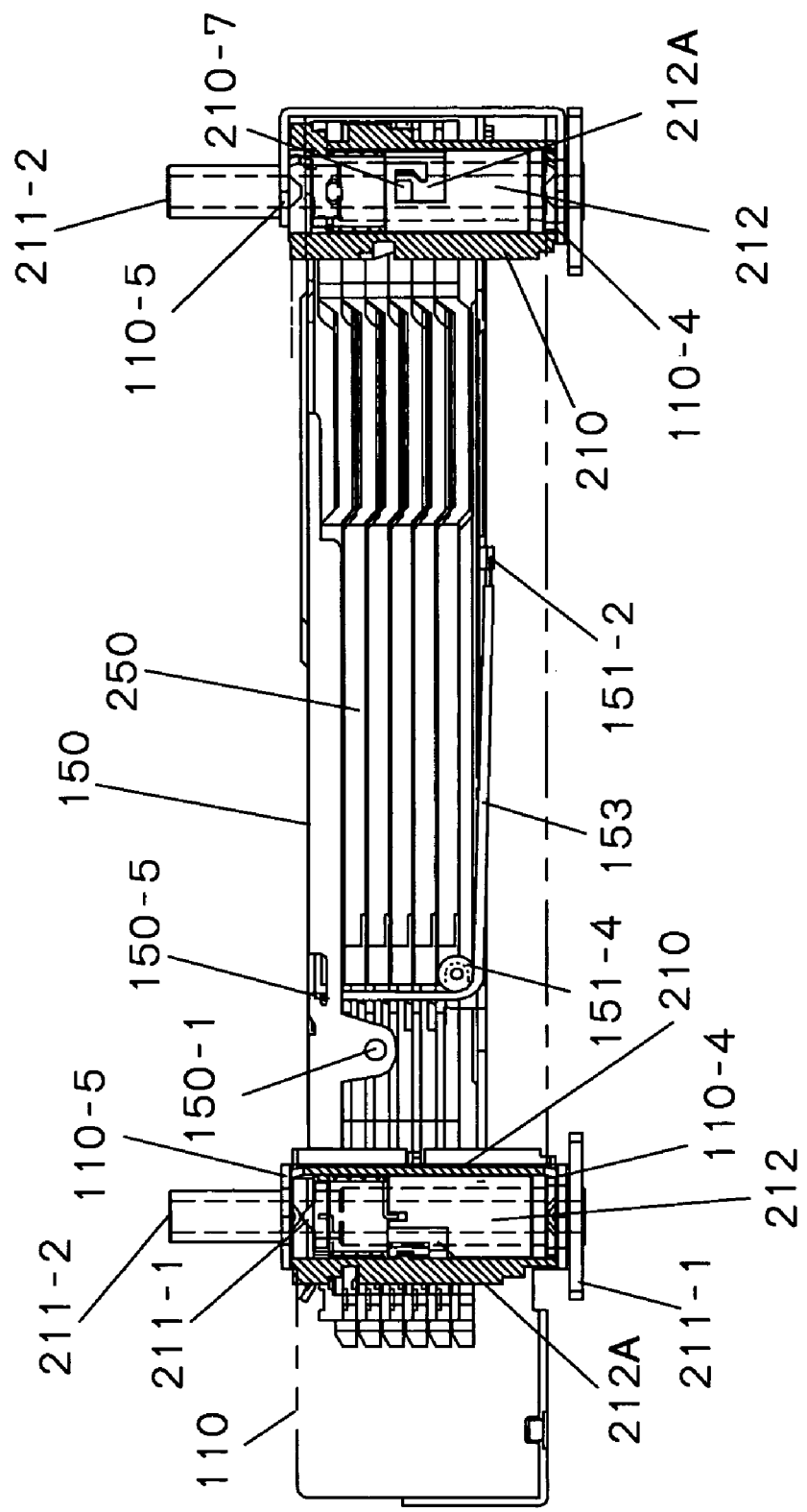
FIG. 6 is a perspective right side view showing a state in which the trays in the disk device shown in FIG. 1 are stacked.
Figure 7:
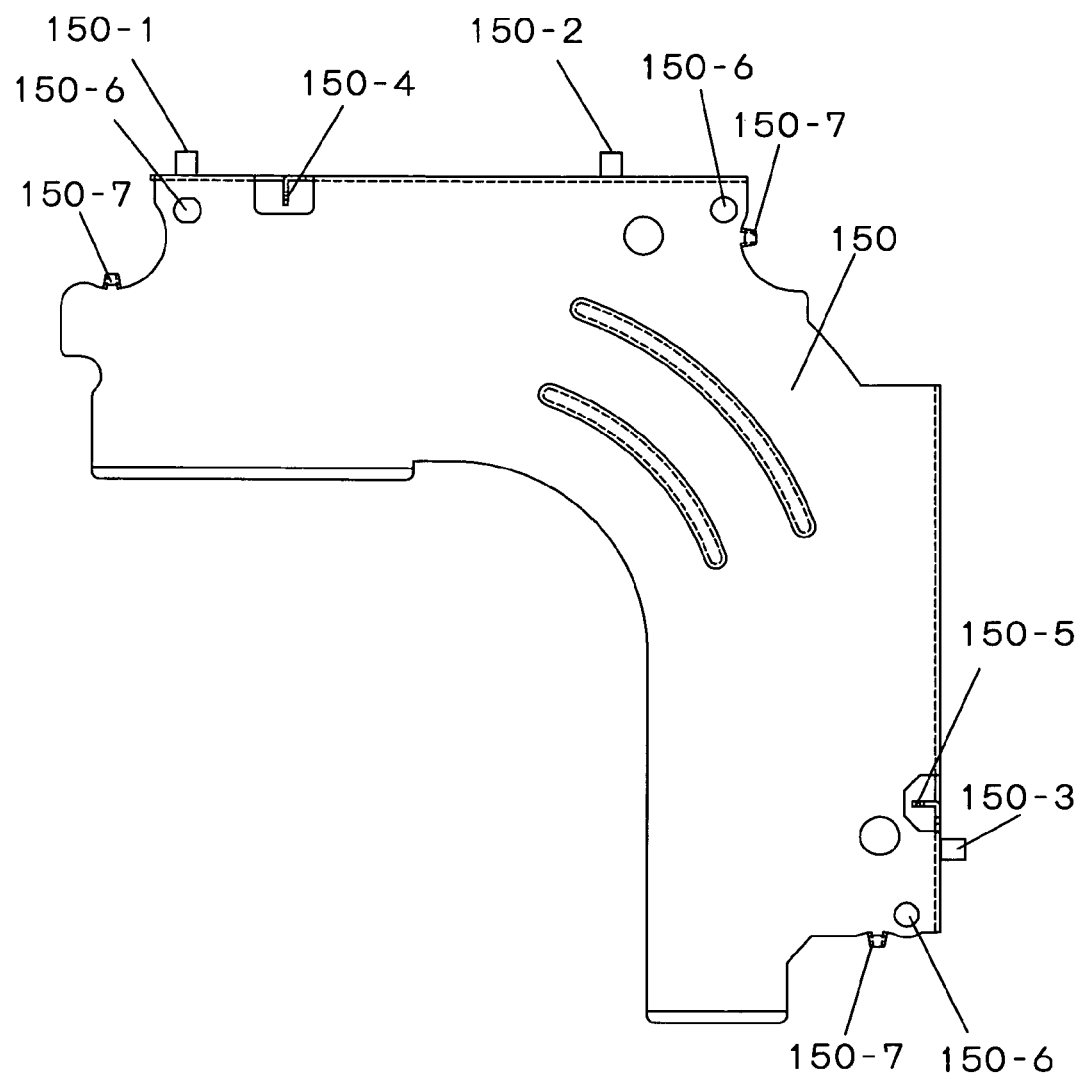
FIG. 7 is a plan view showing a tray top plate of the disk device shown in FIG. 1.

As shown in FIG. 6 and FIG. 7, an upper part of the uppermost tray 250 is provided with a tray top plate 150. Top plate elevating pins 150-1, 2, 3 are fastened on a rear section and a right section of the tray top plate 150 and engaged with top plate guide grooves 101-1, 2, 3 which are formed vertically on the chassis 101 (see FIGS. 23 through 25). These top plate elevating pins 150-1, 2, 3 are engaged with top plate elevating cams 108-3, 107-1 formed on a shift plate 108 and a shift plate which are described hereinafter, thus the tray top plate can move up and down along the top plate guide grooves 101-1, 2, 3 in accordance with a slide movement of the shift plates 108, 107.

Figure 8:
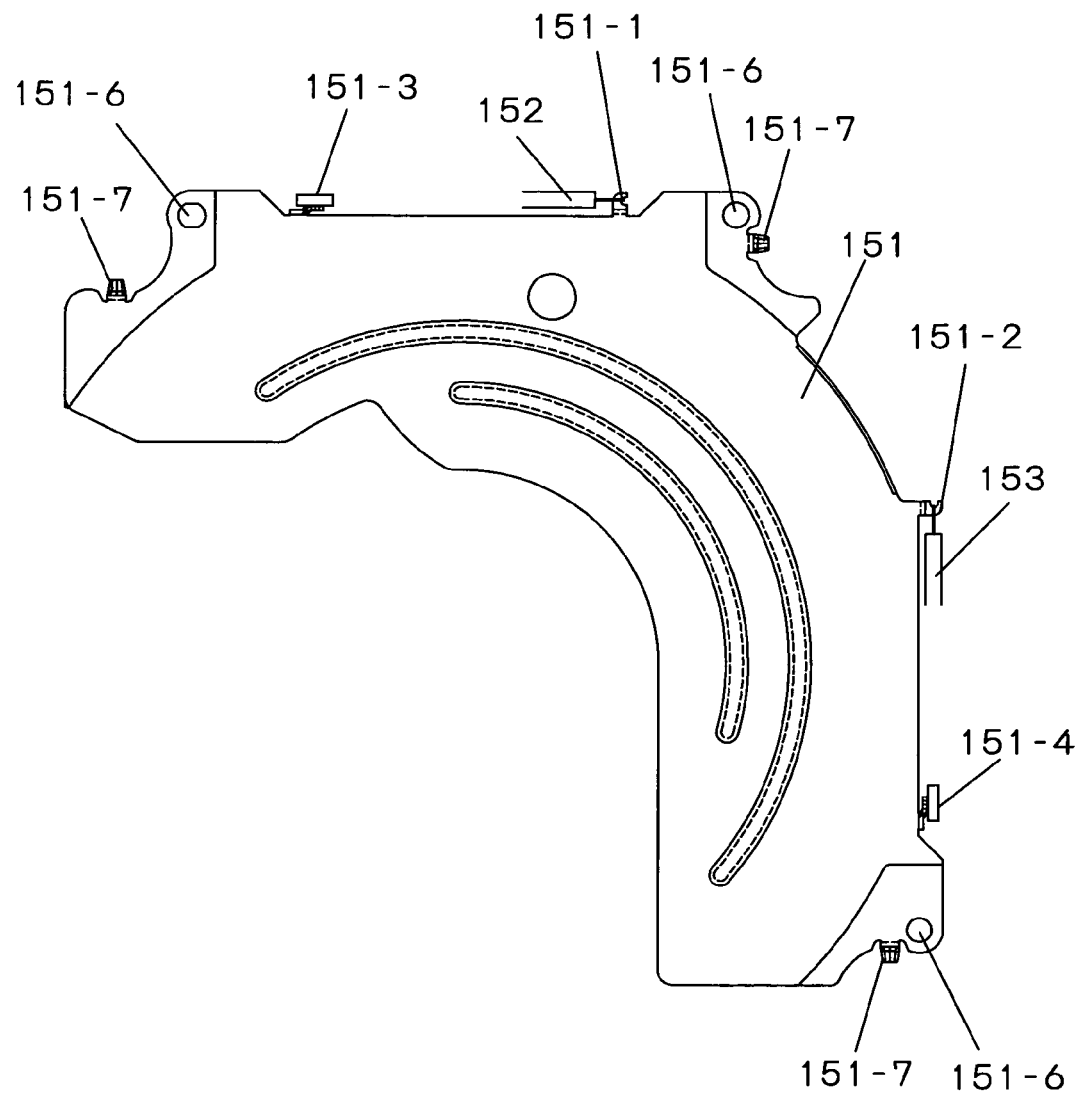
FIG. 8 is a plan view showing a tray bottom plate of the disk device shown in FIG. 1.

As shown in FIG. 6 and FIG. 8, a lower part of the lowermost tray 250 is provided with a tray bottom plate 151 so as to be able to move up and down. A rear section and a right section of the tray bottom plate 151 are provided with hooks 151-1, 2 and pulleys 151-3, 4. One end of each of the springs (the first biasing member described in the claims) 152, 153 is attached to each of the hooks 151-1, 2. The bias force of the springs 152, 153 is converted in a vertical direction by the pulleys 151-3, 4, and other end of each of the springs 152, is attached to each of hooks 150-4, 5 provided on the tray top plate 150. Therefore, the stacked trays 250 are sandwiched between the tray top plate 150 and the tray bottom plate 151 and biased by the springs 152, 153 in the direction in which the trays 250 contact with one another.

It should be noted that in the tray top plate 150 and the tray bottom plate 151, holes 150-6, 151-6 into which the shafts are inserted respectively are formed and nib sections 150-7, 151-7 abutting on the disk selecting cam groove 210-1 of the drum cam 210 are provided, but these parts have the same functions as the holes 250-1, 2, 3 and the nib sections 250-4, 5, 6 of the trays 250, thus the explanations thereof are omitted.

[2. Drum Gear (FIG. 9)]

A drum gear 211 is the axis section described in the claims, that is, a member functioning as the axis sections of the drum cam 210 and a drum sleeve 212. As shown in FIG. 9, this drum gear 211 is formed with a spur gear 211-1 and an upper cylinder section 211-2 which is integrated with the spur gear 211-1 and formed upright in an axial direction. A shaft (not shown), which are fixed upright to the chassis 101, are inserted into the upper cylinder section 211-2. Accordingly, the drum gear 211 is attached to the chassis 101 so as to be able to rotate freely without moving in the vertical direction.

The spur gear 211-1 of the drum gear 211 is engaged with a ring gear 105 which is described hereinafter. Accordingly, the drum gear 211 rotates according to rotation of the ring gear 105. It should be noted that an upper side of the upper cylinder section 211-2 is somewhat small and provided with an engagement groove 211-3 which is a vertical slit.

[3. Drum Sleeve (FIGS. 10 through 12)]

Figure 10:
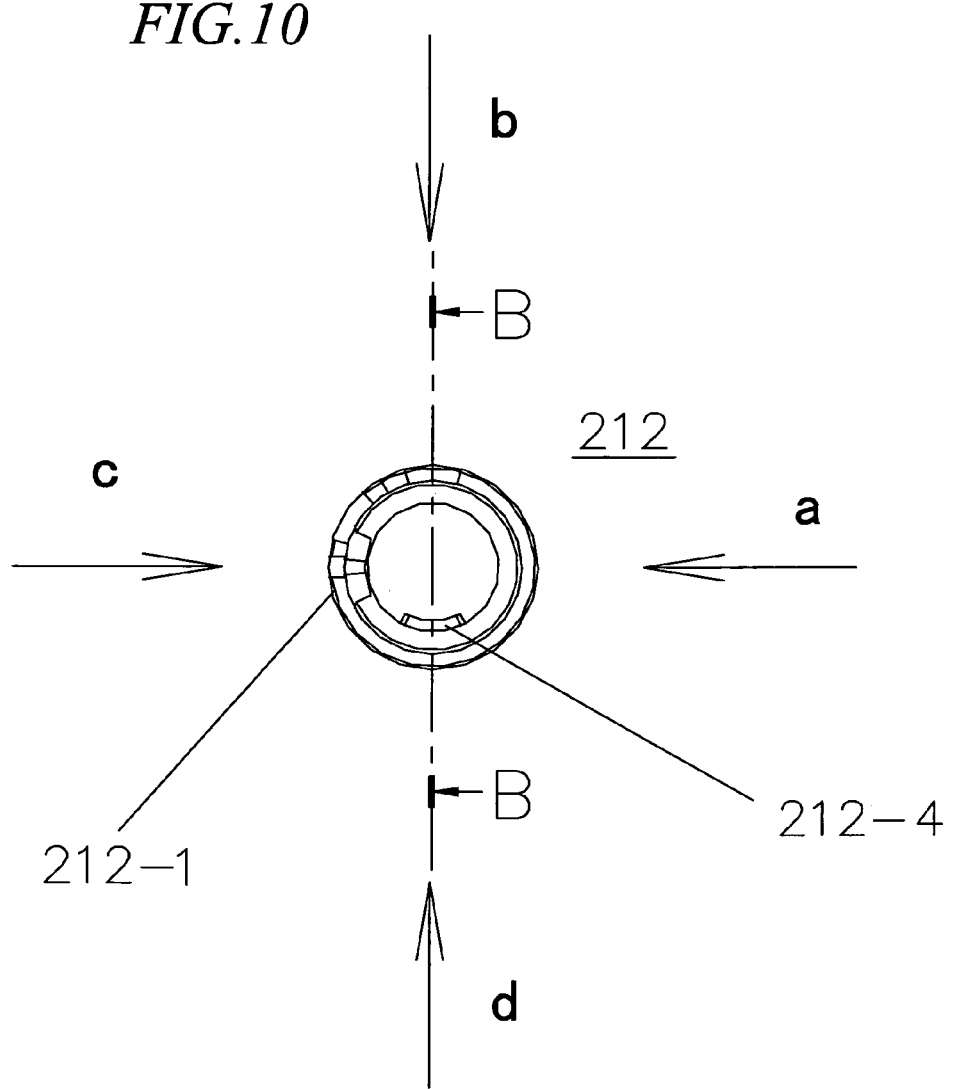
FIG. 10 is a plan view showing a drum sleeve of the disk device shown in FIG. 1.
Figure 11:
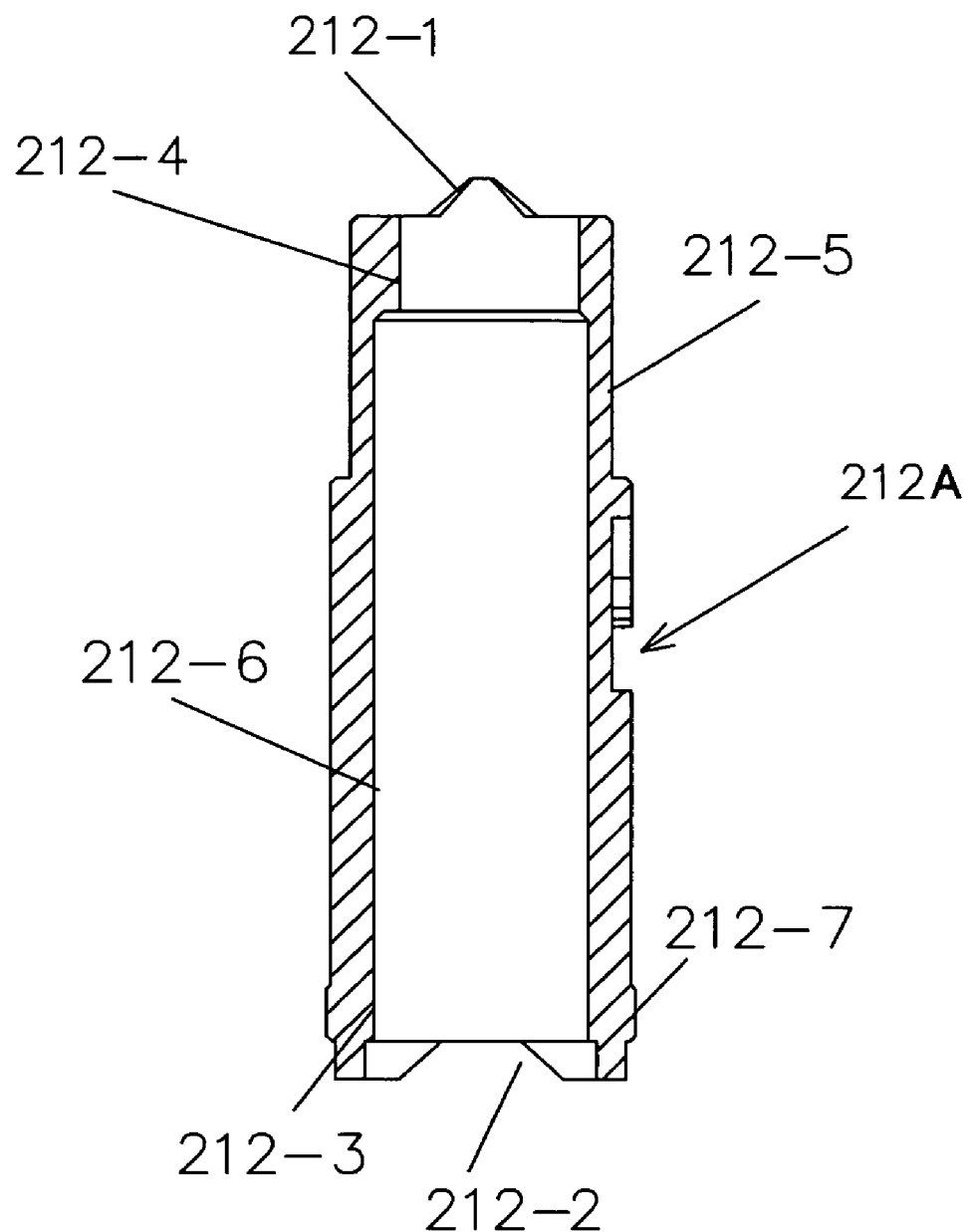
FIG. 11 is a cross-sectional view taken along a line B-B of the drum sleeve shown in FIG. 10.

Next, the drum sleeve 212, which is the transmitting section described in the claims, is described with reference to FIGS. 10 through 12. It should be noted that FIG. 10 is a plan view, FIG. 11 is a cross-sectional view taken along a line B-B shown in FIG. 10, and FIGS. 12a through 12d are side views taken along lines a through d shown in FIG. 11. Specifically, the drum sleeve 212 is a cylindrical member disposed in the pick chassis 110. The upper cylinder section 211-2 of the drum gear 211 is inserted into the hollow section of the drum sleeve 212 (see FIG. 6). An engaging section 212-4 which is formed inside the drum sleeve 212 is engaged with the engagement groove 211-3 of the drum sleeve 212. Therefore, the drum sleeve 212 can move vertically along with the pick chassis 110 and independently from the drum gear 211 on the chassis 101 side, but rotates along with the drum gear 211.

Figure 12:
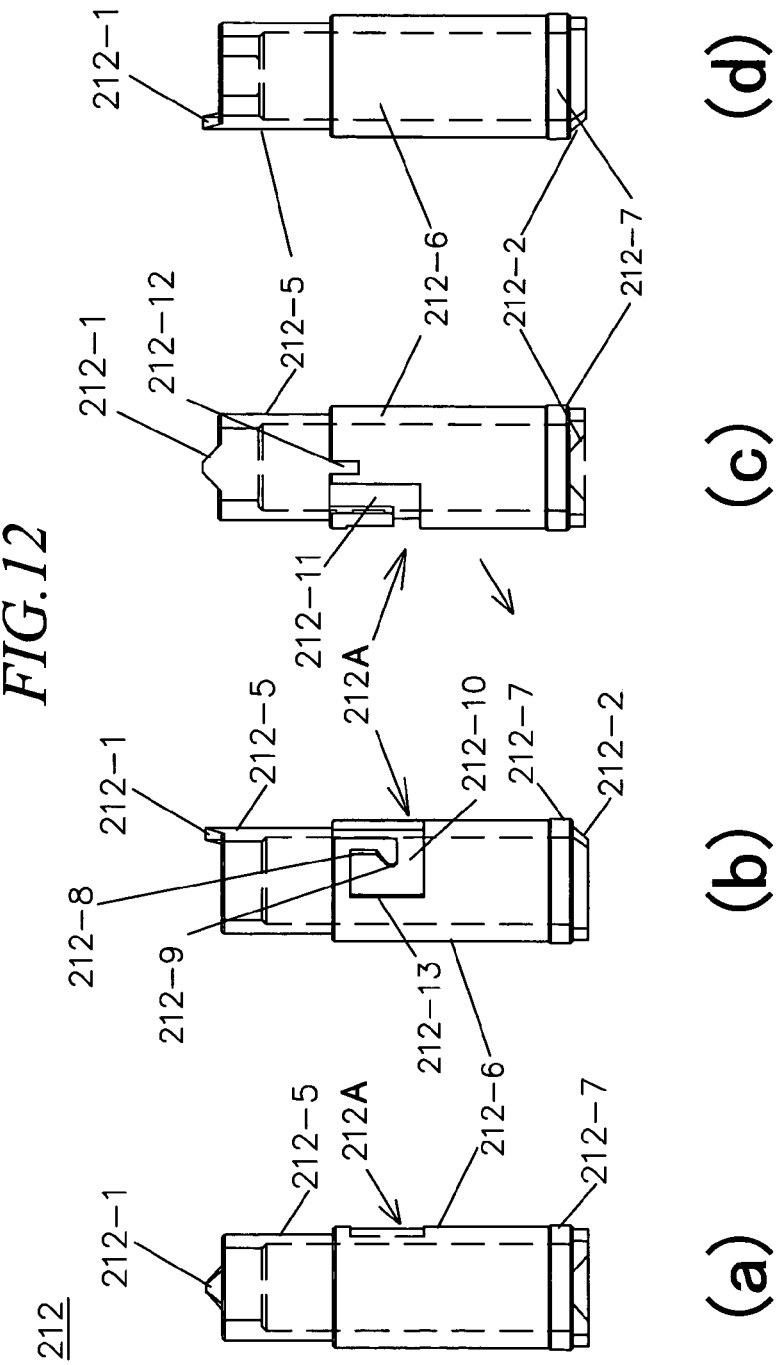
FIG. 12 shows side views, each of which is taken along a line a through d of the drum sleeve shown in FIG. 10.

Furthermore, as shown in FIG. 11 and FIG. 12, an upper edge cam 212-1 is formed on the uppermost level of the drum sleeve 212, and a lower edge cam 212-2 is formed on the lowermost level of same. A part of the uppermost cam 212-1 protrudes in the form of a mountain, and a part of the lower edge cam 212-2 is cut out to form a mountain.

A central cylinder section 212-6 of the drum sleeve 212 has a large diameter, and the external side face thereof is provided with a cam groove 212A, which is generally a continuous dent in the form of substantially a reversed C. This cam groove 212A has a wide permitting section 212-8 for permitting a movement of a protruding section 210-7 of the drum cam 210, which is described hereinafter, and a narrow fixing section 212-9 for fixing the protruding section 210-7 to regulate the movement of the protruding section 210-7. Further, the cam groove 212A has a vertical insertion section 212-11 into which the protruding section 210-7 is inserted when the drum sleeve 212 is inserted into the drum cam 210, and a passage section 212-10 through which the protruding section 210-7 passes when moving from the insertion section 212-11 toward the fixing section 212-9 and permitting section 212-8 sides.

Also, the drum sleeve 212 is provided with an upper cylinder section 212-5 with a diameter fitting into an inner diameter upper section 210-3 of the drum cam 210 and a lower ring-like section 212-7 with a diameter fitting into an inner diameter lower section 210-4 of the drum cam 210, the drum cam 210 being described hereinafter. Moreover, a locking groove 212-12 with which an end section of a spring 410 described hereinafter is locked is formed at an upper end of the central cylinder section 212-6 of the drum sleeve 212.

[4. Drum Cam (FIGS. 13 through 21)]

Figure 13:
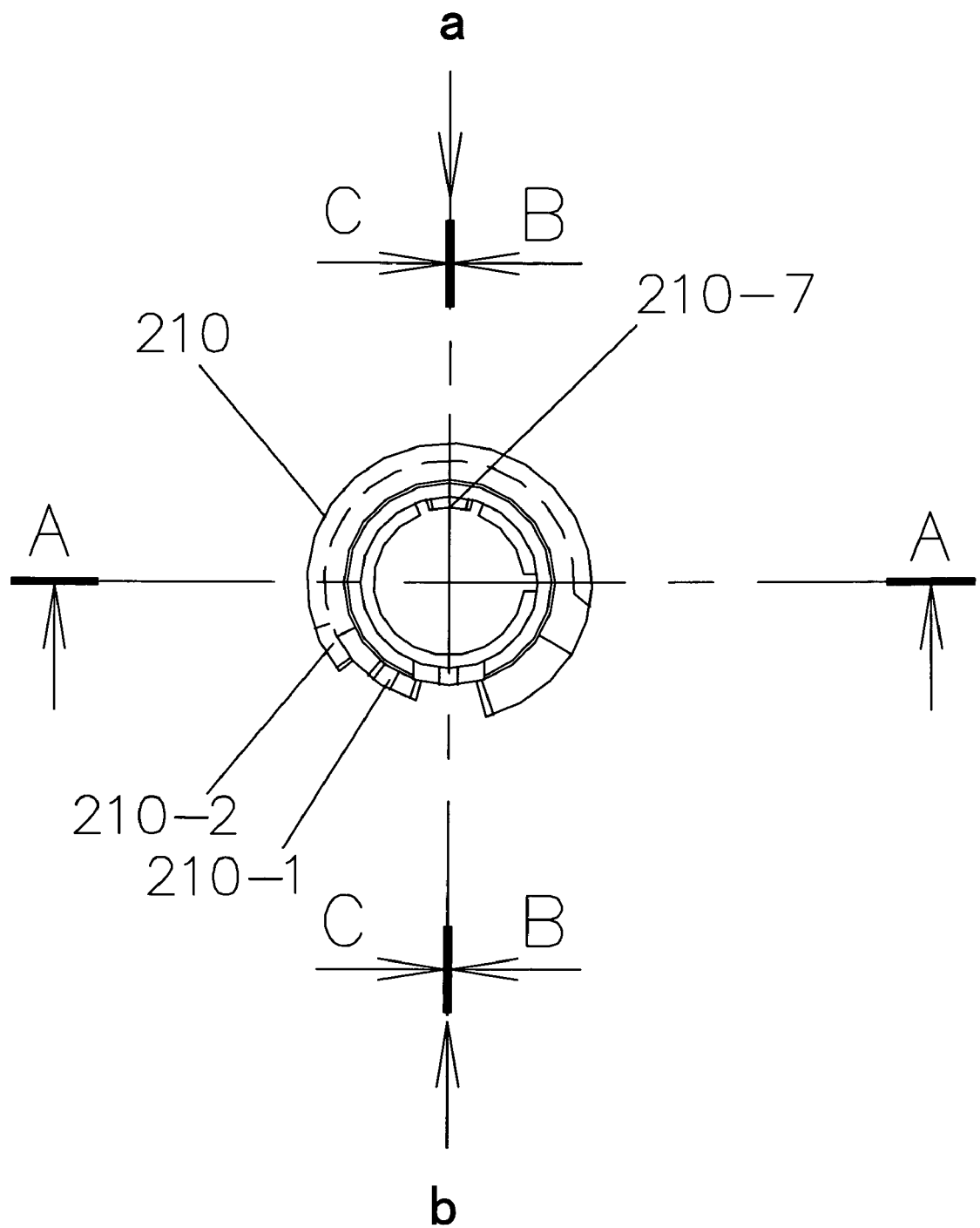
FIG. 13 is a plan view showing a drum cam of the disk device shown in FIG. 1.
Figure 14:
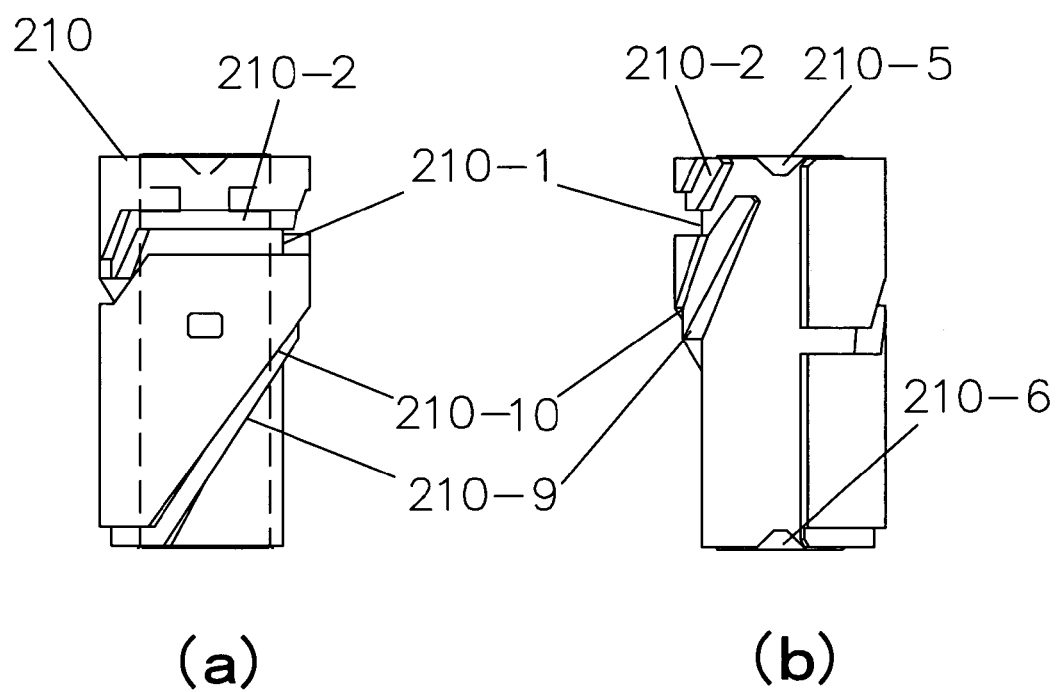
FIG. 14 shows side views, each of which is taken along a line a or b of the drum cam shown in FIG. 13.

The drum cam 210 for moving the trays 250 up and down is described with reference to FIGS. 13 through 21. It should be noted that FIG. 13 is a plan view, FIG. 14 shows side views taken along lines a and b shown in FIG. 13, and FIG. 15 shows cross-sectional views taken along lines A through C shown in FIG. 13. Specifically, the drum cam 210 is a cylindrical member in which the abovementioned drum sleeve 212 is inserted into an inner diameter thereof, and the disk selecting cam groove 210-1 and the arm opening/closing cam groove 210-2 are formed on an external side face of same. The disk selecting cam groove 210-1 is a cam which contacts with the nib sections 250-4, 5, 6 of the tray 250 which is the object of selection. The arm opening/closing cam groove 210-2 is a cam through which the protruding sections 252-1, 253-1 of the holding arm 252 provided on the tray 250 pass, the tray 250 being the object of selection.

Figure 16:
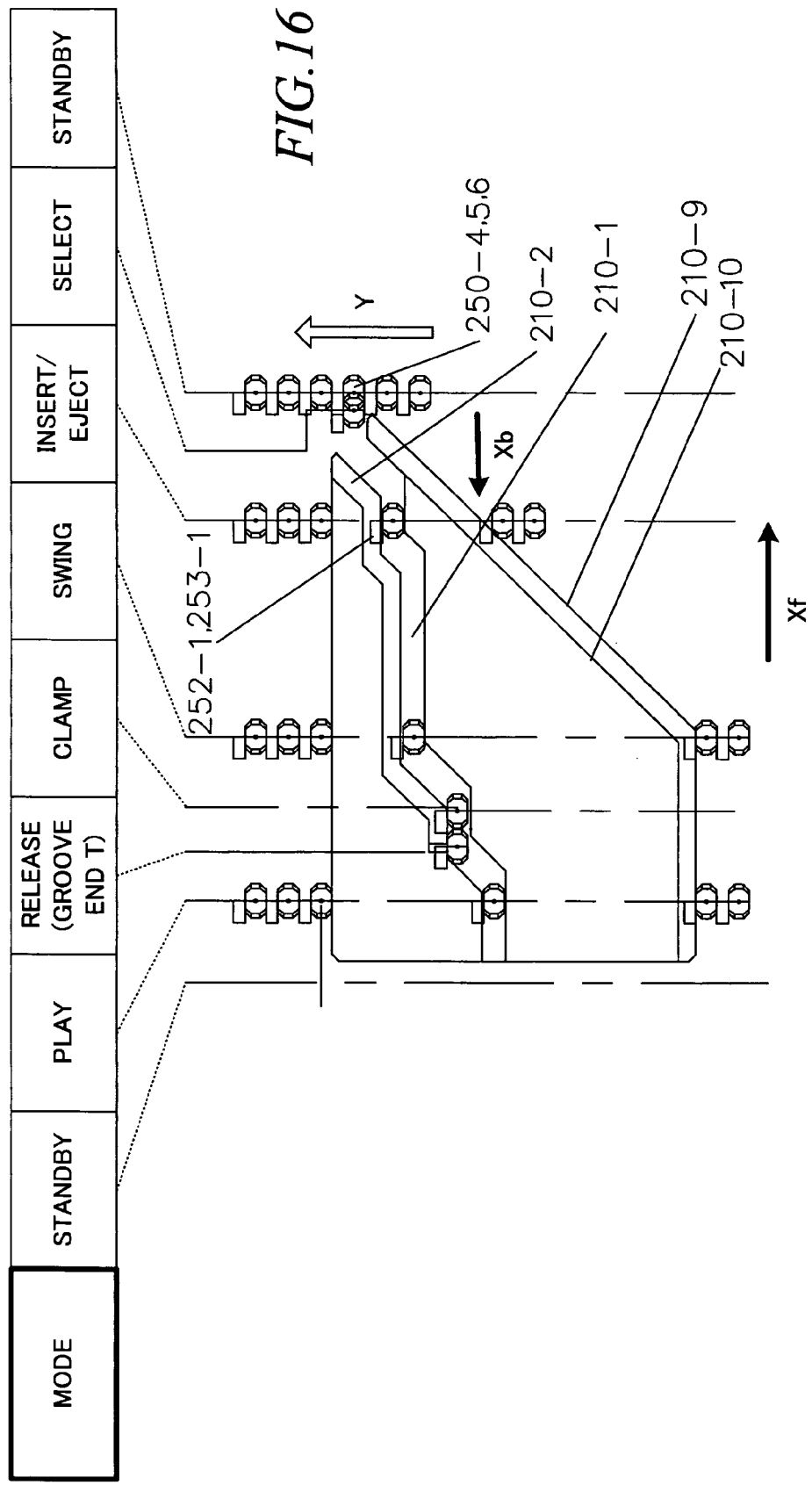
FIG. 16 is a development side view of the drum cam shown in FIG. 13.
Figure 17:
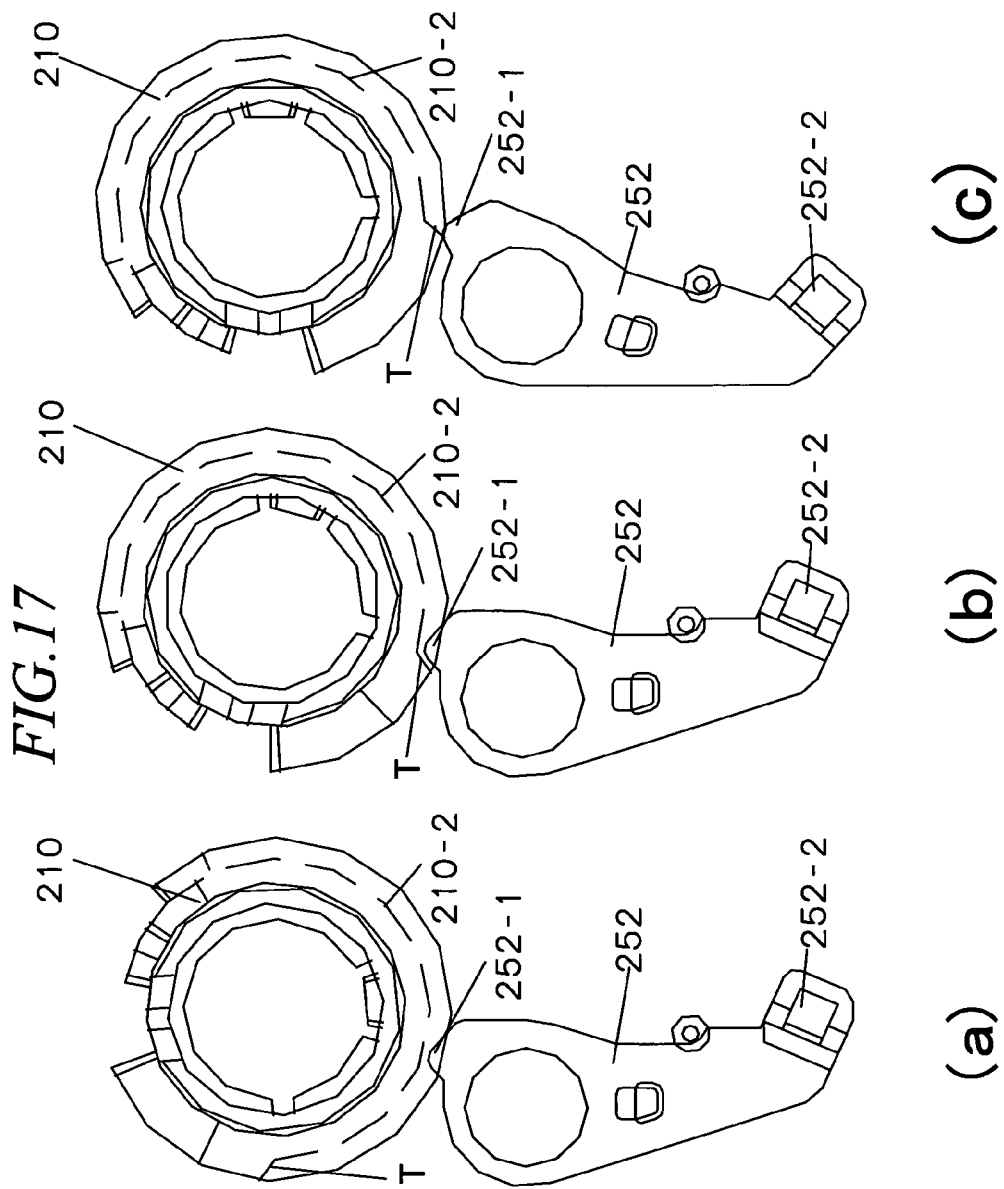
FIGS. 17A and 17B are plan views of a disk holding state showing the holding arm and the drum cam of the disk device shown in FIG. 1.
FIG. 17C is a plan view of a disk releasing state showing the holding arm and the drum cam of the disk device shown in FIG. 1.

As shown in the development side view of FIG. 16, the disk selecting cam groove 210-1 forms steps so as to move a selected tray 250 up and down to a predetermined height in accordance with rotation of the drum cam 210. The arm opening/closing cam 210-2 is formed in parallel with the disk selecting cam groove 210-1 and shallower than the disk selecting cam groove 210-1. As shown in FIGS. 17A through 17C, the arm opening/closing cam groove 210-2 becomes shallow toward a groove end T thereof so as to be level with the external side face of the drum cam 210, thus the protruding sections 252-1, 253-1 are biased by this height difference, whereby the holding arm 252 rotates and the disk D is released.

Further, on the drum cam 210, there are formed a lower leading cam groove 210-9 which abuts on the nib sections 250-4, 5, 6 of the tray 250 located in a lower section of the object of selection, and a lower leading cam groove 210-10 through which the protruding sections 252-1, 253-1 of the holding arm 252 of the same tray 250 pass. The lower leading cam groove 210-9 is an inclined cam which leads the nib sections 250-4, 5, 6 of the tray 250 to a lower end side of the drum cam 210 in accordance with rotation of the drum cam 210 and thereby allows the tray 250 to withdraw. The lower leading cam groove 210-10 is formed in parallel with the lower leading cam groove 210-9 and shallower than the lower leading cam groove 210-9 and leads the protruding sections 252-1, 253-1 to a lower end side of the drum cam 210 so that the holding arm 253 does not rotate. Furthermore, in an upper end section of the drum cam 210, the tray 250, which is located in an upper section of the object of selection, is caused to withdraw upward when the nib sections 250-4, 5, 6 of the tray 250 abut on the upper end section of the drum cam 210.

As shown in FIG. 16, a leading end at which the disk selecting cam groove 210-1 and the lower leading cam groove 210-9 diverge enters between the nib section 250-4, 5, 6 of a desired tray 250 (fourth level from the top in FIG. 16) and the nib section 250-4, 5, 6 of a tray 250 below the desired tray 250 and thereby selects the desired tray 250. A leading end at which the disk selecting cam groove 210-1 and the upper end section of the drum cam 210 diverge enters between the nib section 250-4 of a desired tray 250 and the nib section 250-4, 5, 6 of a tray 250 above the desired tray 250 and thereby selects the desired tray 250.

Figure 18:
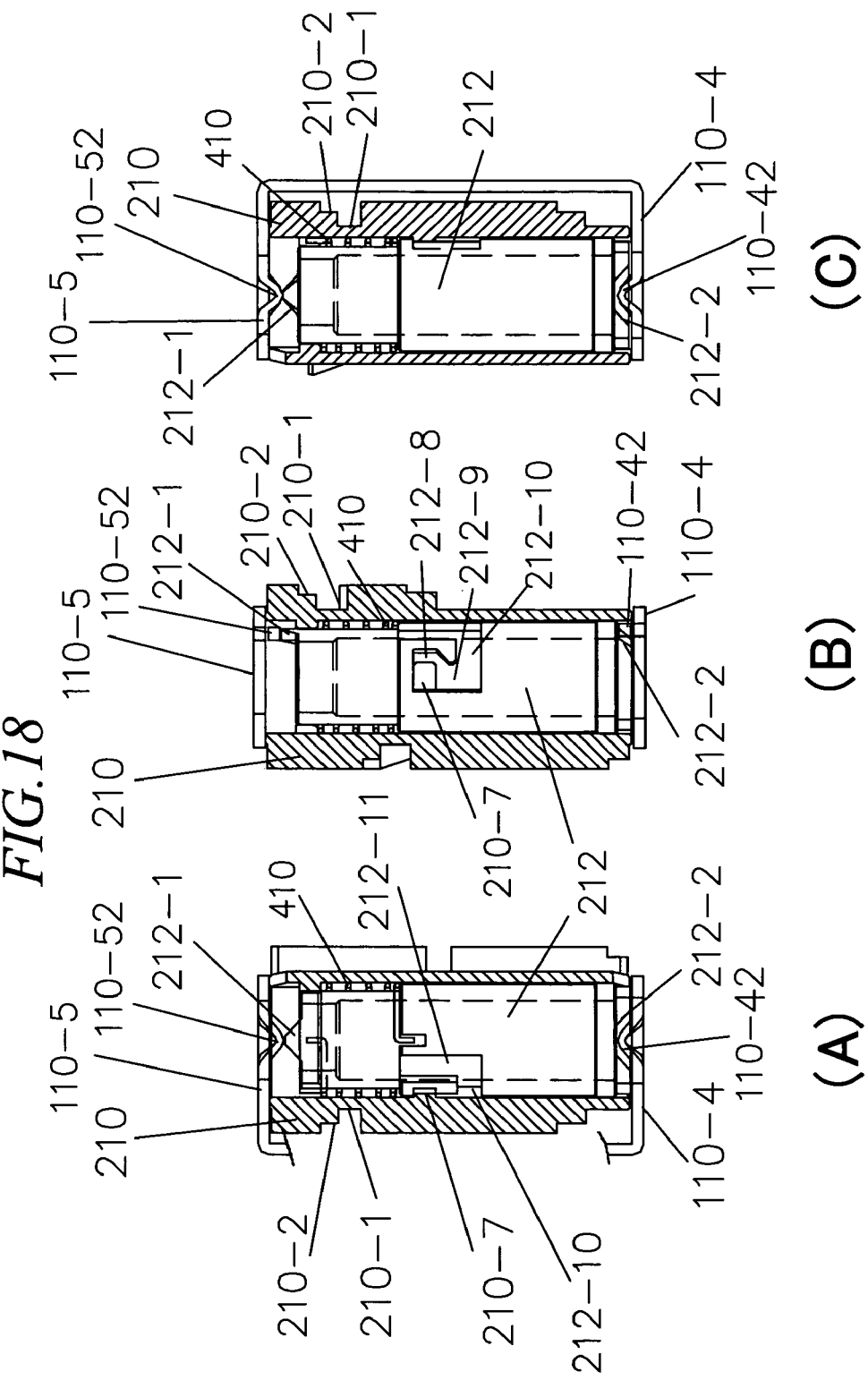
FIGS. 18A through 18C are cross-sectional views showing the drum sleeve and the drum cam of the disk device shown in FIG. 1.

As shown in FIG. 15 and FIG. 18, the protruding section 210-7, which is formed in the inner diameter section of the drum cam 210, passes through the insertion section 212-11 formed on the drum sleeve 212 and reaches the fixing section 212-9 and the permitting section 212-8 via the passage section 212-10, whereby the drum sleeve 212 is inserted into the drum cam 210. As shown in FIG. 19A, when the protruding section 210-7 is placed at the permitting section 212-8, the drum cam 210 can be rotated a predetermined amount relatively with respect to the drum sleeve 212. Further, as shown in FIG. 19B, when the protruding section 210-7 is inserted in the fixing section 212-9, the drum cam 210 is fixed to the drum sleeve 212 and thus cannot be rotated independently from the drum sleeve 212, hence the drum cam 210 rotates along with the drum sleeve 212.

In the drum sleeve 212 into which the drum cam 210 is inserted as described above, the upper cylinder section 212-5 thereof is inserted into the inner diameter upper section 210-3 of the drum cam 210 and the lower ring-like section 212-7 of the drum sleeve 212 is inserted into the inner diameter lower section 210-4 of the drum cam 210. Therefore, when the both [upper cylinder section 212-5 and lower ring-like section 212-7] rotate integrally or independently, they can rotate stably without causing the axes thereof to be inclined.

Furthermore, the drum sleeve 212 moves up and down in the drum cam 210, whereby the position of the protruding section 210-7 is switched. Specifically, as shown in FIG. 20, an upward bending section 110-5 and a downward bending section 110-4, which sandwich and rotatably and pivotally support the drum cam 210 and the drum sleeve 212, are formed in the positions of the three sections corresponding to the drum cam 210 in the pick chassis 110 (see FIG. 1, FIG. 2, and FIG. 6), whereby the vertical movement of the drum cam 210 is regulated.

On the other hand, as shown in FIGS. 18A through 18C and FIG. 19A, in the drum sleeve 212, the upper edge cam 212-1 and the lower edge cam 212-2, which are provided on the top and bottom thereof, are engaged with restricting sections 110-52, 110-42 formed on the upward bending section 110-5 and the downward bending section 110-4. At this moment, the protruding section 210-7 is in the permitting section 212-8. As shown in FIG. 19B, when the engagement among the upper edge cam 212-1, the lower edge cam 212-2, and the restricting sections 110-52, 110-42 is removed in accordance with rotation of the drum sleeve 212, the restricting section 110-42 biases a lower end of the drum sleeve 212 upward, whereby the drum sleeve 212 is pushed upward and the protruding section 210-7 enters the fixing section 212-9.

Figure 19:
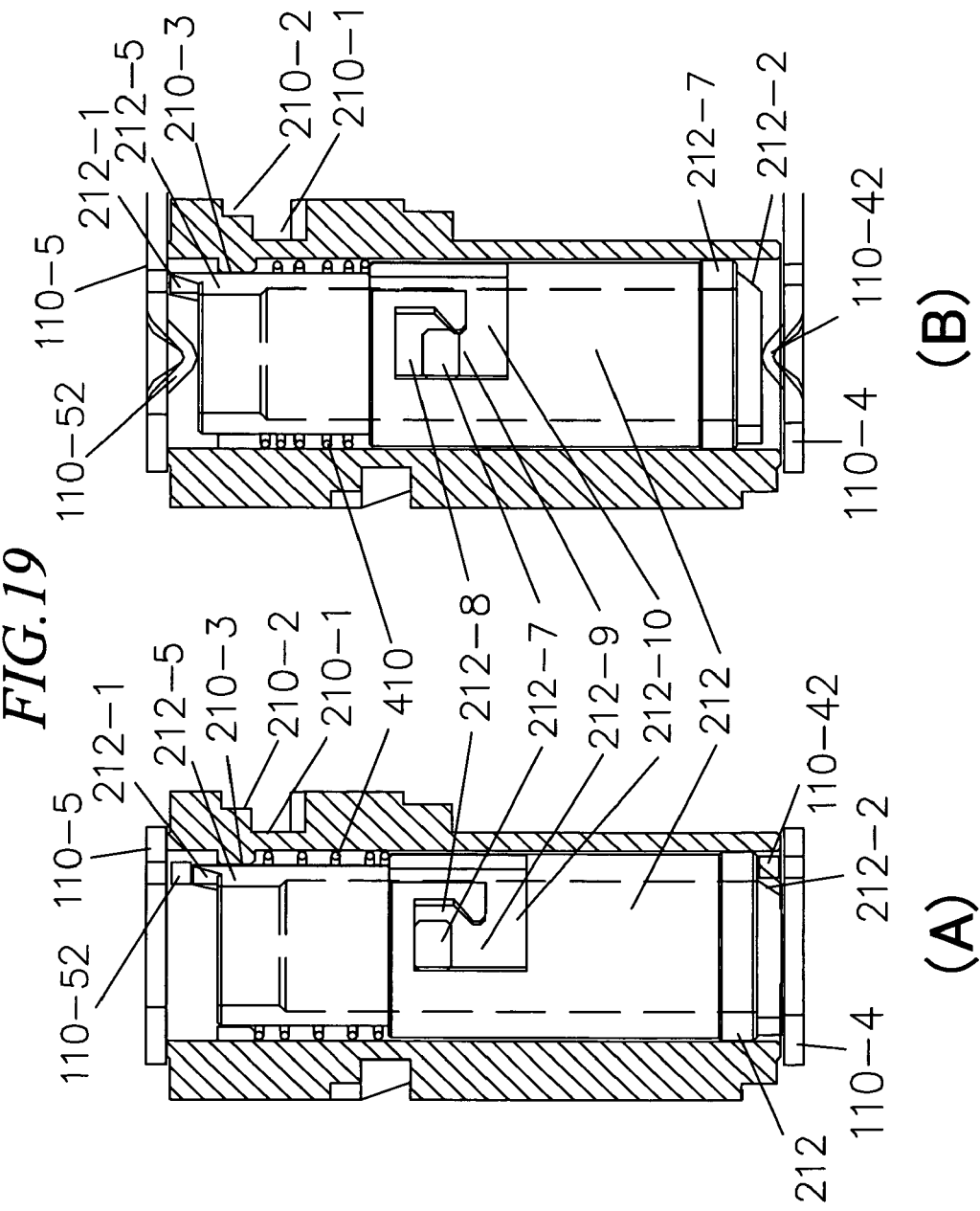
FIG. 19A is a cross-sectional view showing a position at which rotation of the drum cam with respect to the drum sleeve shown in FIG. 18 is permitted.
FIG. 19B is a cross-sectional view showing a position at which the rotation of the drum cam with respect to the drum sleeve shown in FIG. 18 is fixed.

Further, the coil-like spring 410 shown in FIG. 21 is disposed between the drum cam 210 and the drum sleeve 212. Specifically, as shown in FIG. 18 and FIG. 19, an upper end of the spring 410 is locked onto the inner diameter upper section 210-3 provided in the inner diameter section of the drum cam 210, and a lower end of the spring 410 is locked onto the locking groove 212-12 provided on the outer periphery of the drum sleeve 212. Accordingly, the spring 410 biases the drum cam 210 in the counterclockwise direction viewed from above (rotation direction at the time of selecting a disk), and biases the drum sleeve 212 downward.

[5. Pick Chassis (FIGS. 22 through 26)]

Figure 22:
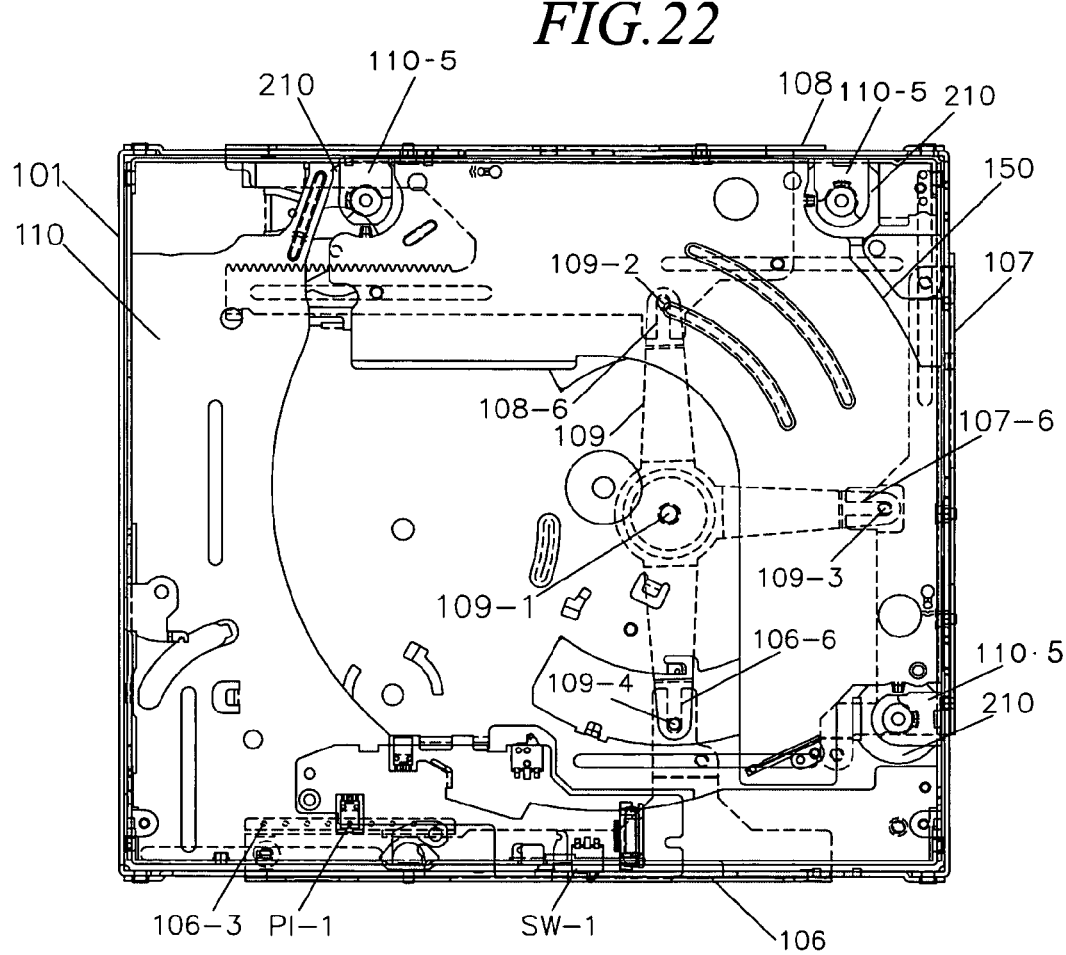
FIG. 22 is a plan view showing a chassis and a pick chassis of the disk device shown in FIG. 1.

The drum sleeve 212 and the drum cam 210 are provided on the pick chassis 110 disposed in the chassis 101, as shown in FIG. 22. This pick 110 is provided so as to be able to move up and down in the chassis 101, and is formed with a substantially fan-shaped gap so as not to interfere with the disk D and the trays 250 by moving up and down. The structure for moving such pick chassis 110 up and down is as follows.

Specifically, the front, rear, right and left side faces of the pick chassis 110 are bent along the inner side face of the chassis 101 so as to be at a right angle with respect to the bottom face. The rear face (FIG. 23), right side face (FIG. 24) and front face (FIG. 25) of the pick chassis 110 are calked by pick elevating pins 110-1, 2, 3 respectively. These pick elevating pins 110-1, 2, 3 are engaged with the vertical top plate guide groove 101-1 formed in the cassis 101 and pick guide grooves 101-4, 5. The pick elevating pins 110-1, 2, 3 are engaged with pick elevating cams 108-4, 107-2, 106-2, which are grooves or holes formed respectively on the shift plates 108, 107, 106 provided slidably on the rear face, right side face, and front face of the chassis 101.

The pick elevating cams 108-4, 107-2, 106-2 and the abovementioned top plate elevating cams 108-3, 107-1 have a horizontal straight section for holding the tray top plate 150 and the pick chassis 110 at fixed positions and a step-like section for moving [the tray top plate 150 and the pick chassis 110] up and down. When one [of the horizontal straight section and the step-like section] is positioned at a fixed position, the other elevates, and vice versa. More specifically, when the shift plates 108, 107, 106 synchronously slides, the pick chassis 110 moves vertically while the tray top plate 150 is held at an upper section, or the tray top plate 150 elevates while the pick chassis 110 is held at a lower section.

Figure 26:
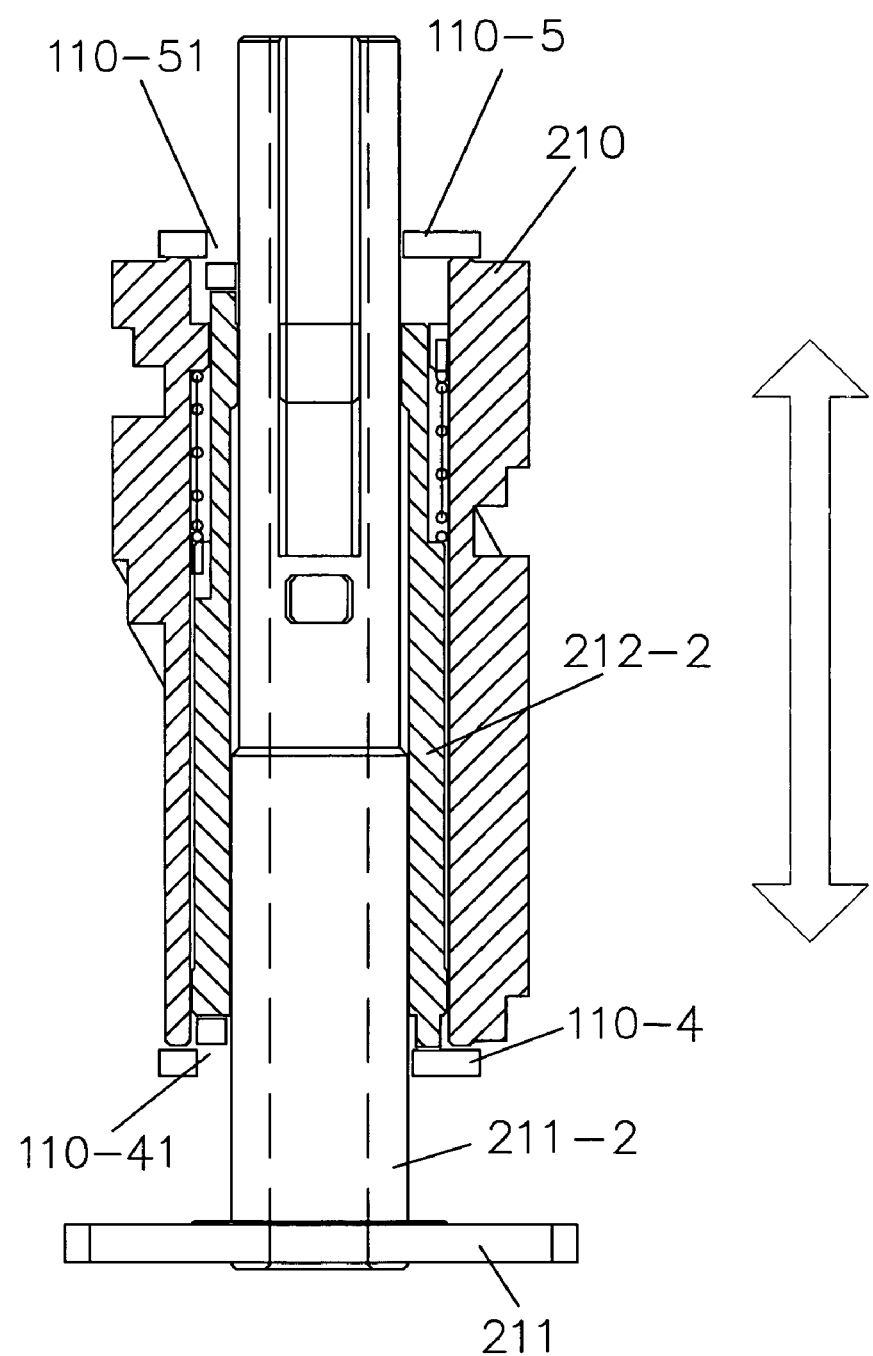
FIG. 26 is a cross-sectional view showing a state in which the drum gear, drum sleeve, and drum cam of the disk device shown in FIG. 1 are assembled.

It should be noted that the drum cam 210 and the drum sleeve 212, which are regulated vertically by the upward bending section 110-5 and the downward bending section 110-4 of the pick chassis 110, move up and down along the upper cylinder section 211-2 of the drum gear 211 as the pick chassis 110 moves vertically, as shown in FIG. 26. In order to enable this up-and-down movement, on the upward bending section 110-5 and the downward bending section 110-4, there are formed through-holes 110-51, 110-41 through which the upper cylinder section 211-2 of the drum gear 211 can freely pass, as shown in FIG. 20 and FIG. 26.

Figure 25:
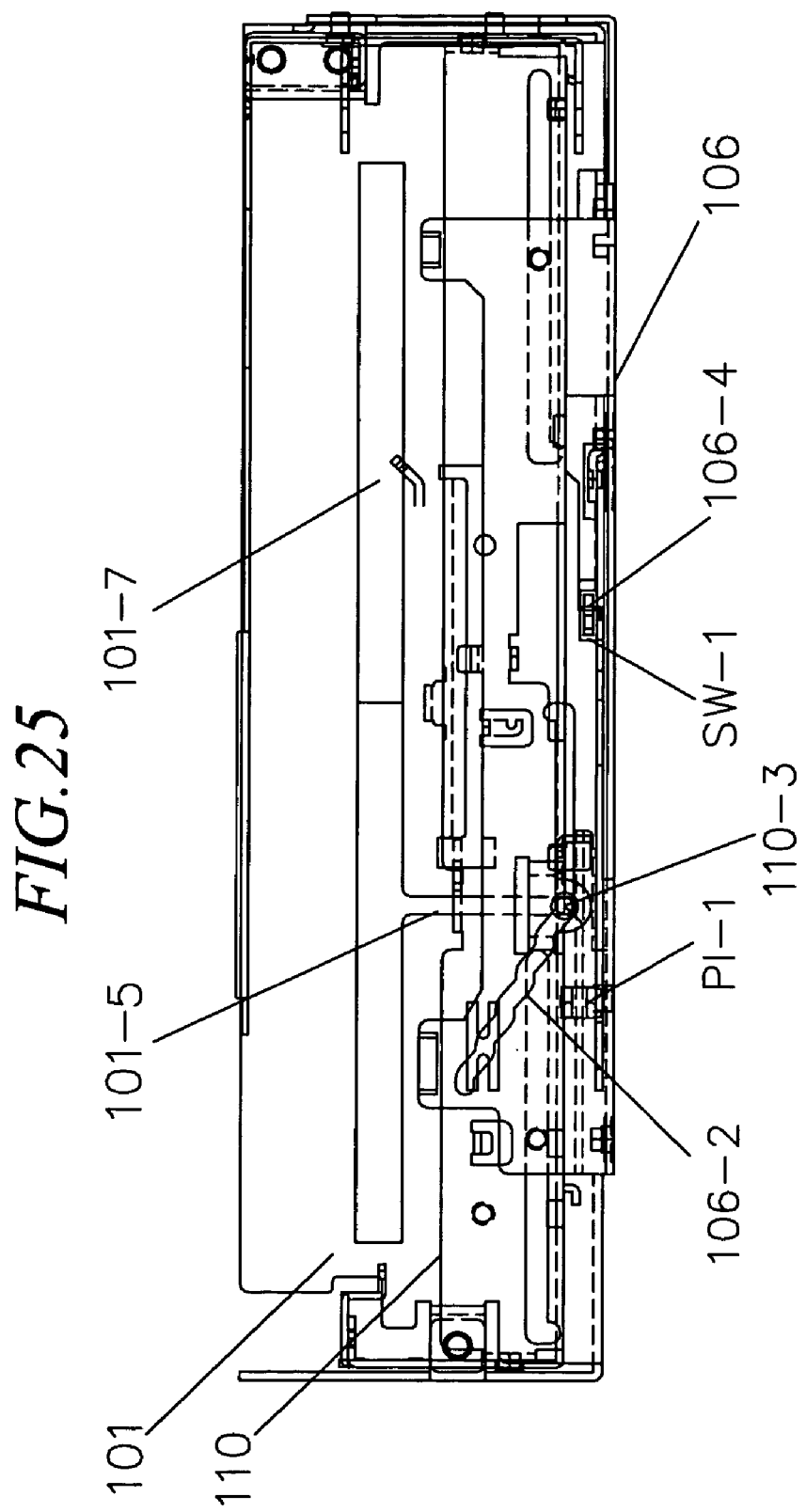
FIG. 25 is a front view showing the chassis and the shift plate of the disk device shown in FIG. 1.

Furthermore, as shown in FIG. 25, the front face of the chassis 101 is provided with a disk insertion opening 101-7. As shown in FIG. 2, the front face side of the pick chassis 110 is provided with a loading arm 256 which abuts on the edge of the disk D and thereby changes the direction in which [the disk D] is conveyed from the disk insertion opening 101-7 to the tray 250 or from the tray 250 to the disk insertion opening.

[6. Pick Arm (FIGS. 1, 2)]

The pick arm 130 is attached to an upper part of the left bottom face of the pick chassis 110 so as to be able to rotate freely around an axis 130-1 as a spindle as shown in FIGS. 1 and 2. A leading end of the pick arm 130 (opposite end from the axis 130-1) is provided with a hook 130-5. This hook 130-5 is a section held on the rear face side of the pick chassis 110 when the pick arm 130 is swung. Specifically, a holding section 129, which is a pair of plates in the horizontal direction, is fixed on a right rear corner of the pick chassis 110, and the hook 130-5 is held between these plates.

Figure 27:
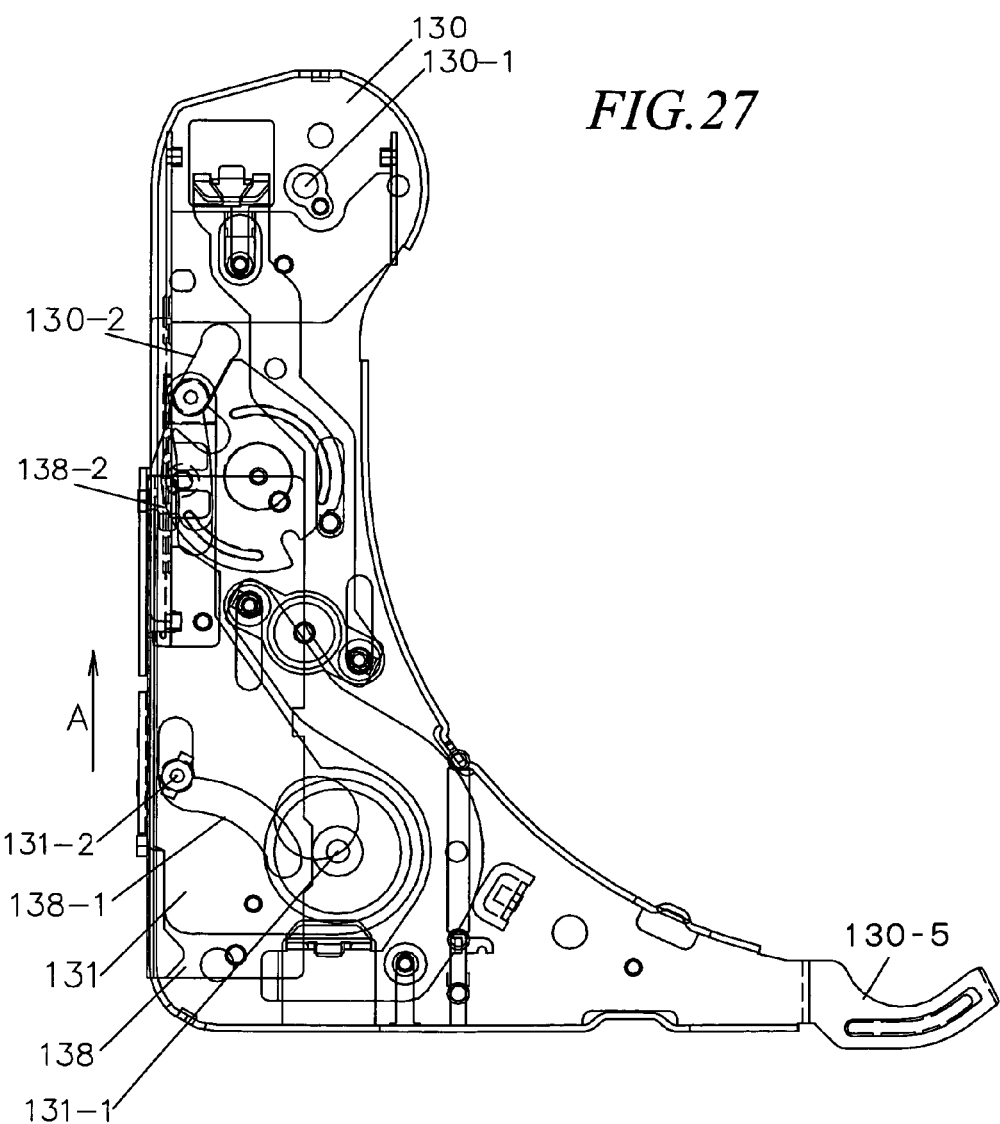
FIG. 27 is a plan view showing a pick arm of the disk device shown in FIG. 1.
Figure 28:
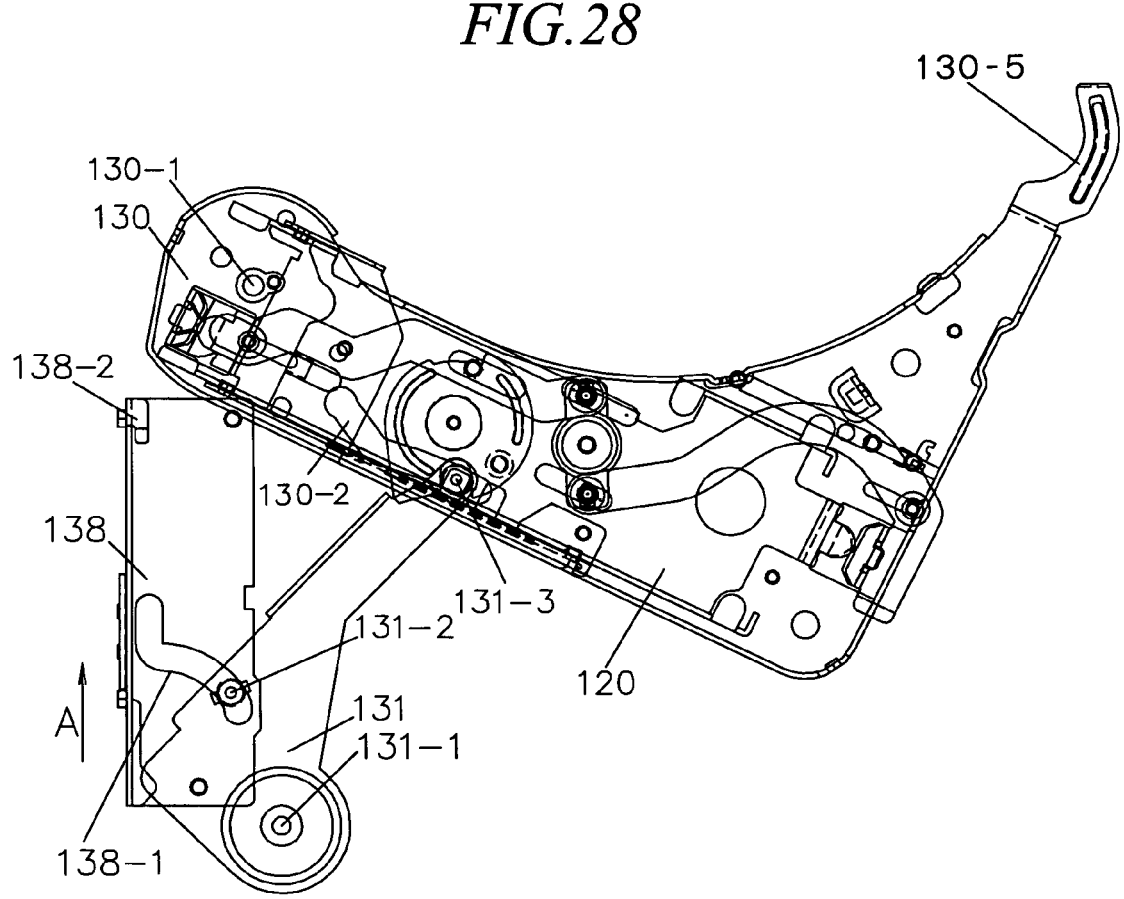
FIG. 28 is a plan view showing a state in which the pick arm shown in FIG. 27 is swung.

Furthermore, on the pick arm 130, there is formed a connecting cam 130-2 which is a groove or a hole to which drive power of a pick swing arm 131 is transmitted, the pick swing arm 131 be described hereinafter (see FIGS. 27, 28). This connecting cam 130-2 has an inclined section for rotating the pick arm 130 and an arc section continuing to [the inclined section]. Moreover, the pick arm 130 is provided with a turning table 123, a drive chassis 120 having members required for playing a disk, such as a pick up (not shown), and a clamp arm 124 having a clamper 125 and the like for holding the disk D between the turning table 123 and the clamper 125.

[7. Pick Swing Arm (FIGS. 27, 28)]

The pick swing arm 131 is disposed between the pick arm 130 and the pick chassis 110 and attached to the pick chassis 110 so as to be rotatable around an axis 131-1 engaged with a hole of the pick chassis 110. A roller 131-2 is rotatably attached to a left reverse face of the axis 131-1 of the pick swing arm 131. This roller 131-2 is inserted into a swinging cam 138-1 (described hereinafter) of a pick swing cam plate 138. A two-stage roller 131-3 is attached rotatably to a leading end section of the pick swing arm 131. This two-stage roller 131-3 is, as described above, inserted into the connecting cam 130-2 provided on the pick arm 130.

[8. Pick Swing Cam Plate (FIGS. 27, 28)]

The pick swing cam plate 138 is attached to the reverse face of the pick chassis 110 so as to be able to slidingly move back and forth. In this pick swing cam plate 138, as shown in FIG. 28, a left end section thereof is bent upward, and a lifting section 138-2, which is bent inwardly to form a step, is formed above [the bent left end section]. This lifting section 138-2 is, as shown in FIG. 1, lifts up the clamp arm 124 from the bottom and thereby secures a clearance for inserting the disk D.

The roller 131-2 of the pick swing arm 131 is inserted into the swinging cam 138-1, which is a groove or a hole formed on the bottom face of the pick swing cam plate 138, and the rear section [of the swinging cam 138-1] is formed straight in an anterior-posterior direction while the front section of same is in the form of an arc. Therefore, as shown in FIG. 27 and FIG. 28, when the pick swing cam plate 138 moves backward (direction of A), the pick swing arm 131 rotates clockwise. It should be noted that, in accordance with such rotation of the pick swing arm 131, the two-stage roller 131-3 attached to the front part of the pick swing arm 131 biases [the pick arm 130] so that the pick arm 130 rotates counterclockwise, while moving inside the connecting cam 130-2 formed on the pick arm 130.

[9. Ejecting Arm (FIGS. 1, 29)]

Figure 29:
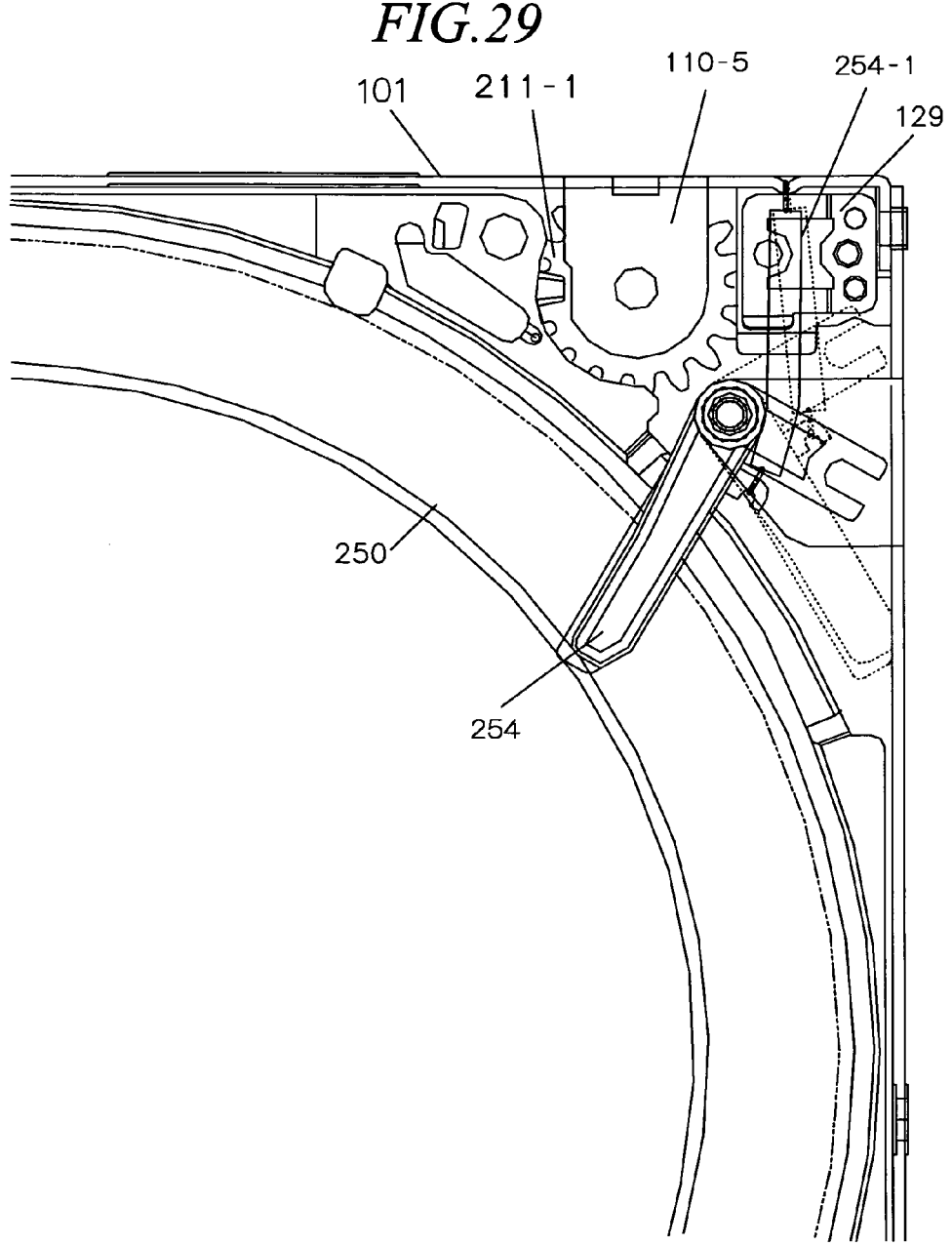
FIG. 29 is a plan view showing an ejecting arm of the disk device shown in FIG. 1.

As shown in FIG. 1 and FIG. 29, an ejecting arm 254 for biasing a disk D, which is an object of ejection, in an ejection direction is provided rotatably in the vicinity of the tray 250 of the pick chassis 110. The ejecting arm 254 is biased in a direction of withdrawing from the disk D by a spring 254-1 disposed between the ejecting arm 254 and the pick chassis 110. One end of a link plate 143 described hereinafter is connected rotatably to an end section of the ejecting arm 254.

[10. Drive Mechanism (FIGS. 30, 31)]

Figure 30:
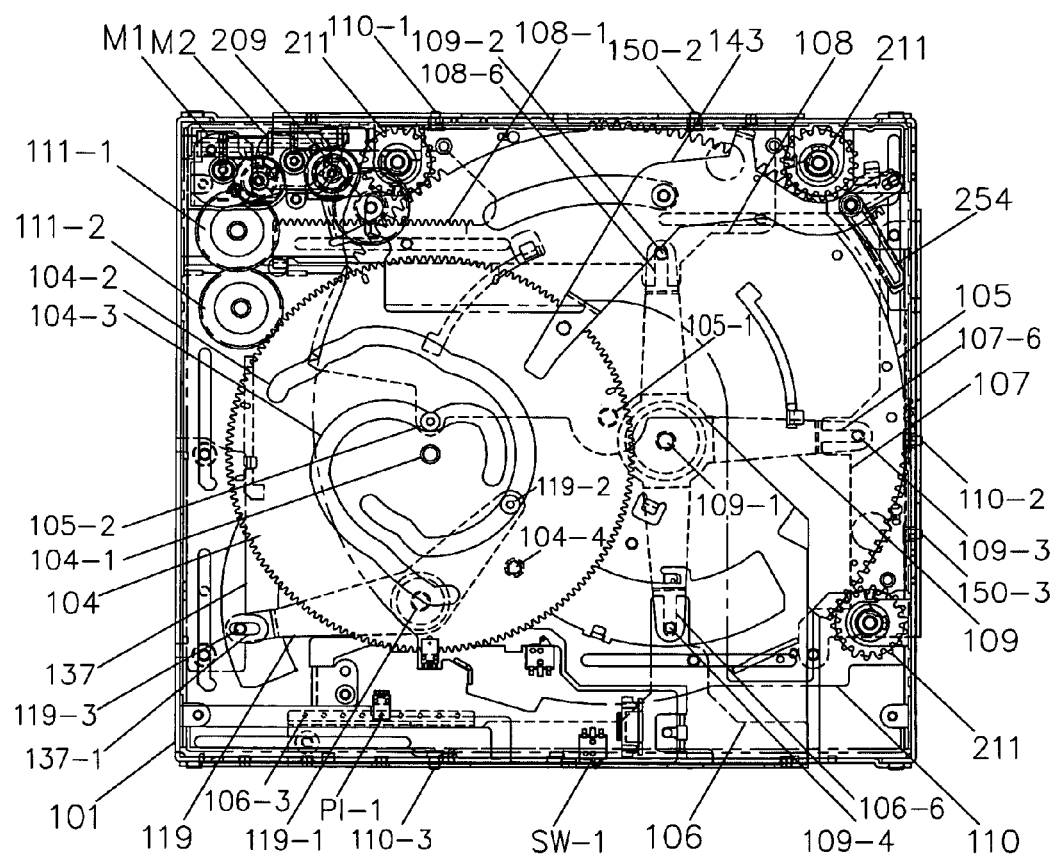
FIG. 30 is a perspective plan view showing a drive mechanism and an elevating mechanism of the disk device shown in FIG. 1.

Next, a drive mechanism for driving the drum cam 210, pick swing cam plate 138, and ejecting arm 254 is described hereinafter. Specifically, as shown in FIG. 30, the bottom face of the chassis 101 is provided with the ring gear 105 so as to be able to rotate around an axis 105-1. The ring gear 105 is a substantially fan-shaped plate, and gear grooves for engaging respectively with the spur gears 211-1 of three drum gears 211 are formed on the rim of the ring gear 105. Therefore, when the ring gear 105 rotates, the drum gears 211 rotates, and accordingly the drum sleeve 212 and drum cam 210 rotate. Furthermore, a roller 105-2 is rotatably attached to the left side of the axis 105-1 of the ring gear 105.

A link arm 119 is provided in front of the left side of the axis 105-1 of the ring gear 105. This link arm 119 is attached to an upper part of the bottom face of the chassis 101 so as to be rotatable around an axis 119-1. One end of the link arm 119 is provided with a roller 119-2 rotatably, and the other end is integrated with a pin 119-3. The pin 119-3 is connected to a slide plate 137 so as to be able to rotate and move right and left, the slide plate 137 being described hereinafter.

An upper section of the ring gear 105 and link arm 119 is provided with a circular cam plate 104 capable of rotating around an axis 104-1 provided on the bottom face of the chassis 101. A gear groove is formed on an outer periphery of the circular cam plate 104. Further, a swing drive cam 104-2, which is a groove or a hole engaged with the roller 119-2 provided on the link arm 119, and a drum drive cam 104-3, which is a groove or a hole engaged with the roller 105-2 provided on the ring gear 105, are formed on the circular cam plate 104.

Each of the swing drive cam 104-2 and drum drive cam 104-3 is in the form of a continuous meander groove, and the rollers 105-2, 119-2 engaged therewith respectively change the distance to the axis 104-1 in accordance with rotation of the circular cam plate 104, whereby the link arm 119 and the ring gear 105 are biased. Moreover, in the circular cam plate 104, a boss 104-4 as a protruding section is integrally formed in a lower right of the axis 104-1 and an outer peripheral section of the swing drive cam 104-2.

The link plate 143 is rotatably provided on the bottom face on the back side of the chassis 101. One end of the link plate 143 is connected rotatably to an end section of the ejecting arm 254. The other end of the link plate 143 rotates by being biased by the boss 104-4, in accordance with rotation of the circular cam plate 104.

The slide plate 137 is provided on the left side face of the chassis 101 so as to be able to slidingly move back and forth. The pin 119-3 of the link arm 119 is connected to a connection hole 137-1 provided on the slide plate 137, so as to be able to rotate and move right and left. Moreover, as shown in FIG. 31, the left side face of the slide plate 137 is provided with an abutting section 137-2 which is caused to stand vertically. This abutting section 137-2 abuts on the pick swing cam plate 138.

A motor M1 as a driving source is attached to a left side corner at the back of the chassis 101. The rotary drive power of the motor M1 is transmitted to spur gears 111-1, 111-2 attached rotatably onto the chassis 101, via a speed reduction mechanism. The spur gear 111-2 is engaged with a gear provided on the outer periphery of the circular cam plate 104. Therefore, when the drive power of the motor M1 is transmitted to the circular cam plate 104 via the speed reduction mechanism and the spur gears 111-1, 111-2, the circular cam plate 104 rotates, at the same time the swing drive cam 104-2 and the drum drive cam 104-3 move, and accordingly the rollers 119-2, 105-2 are biased, whereby the link arm 119 and the ring gear 105 rotate.

It should be noted that when the drum drive cam 104-3 drives the ring gear 105 and thereby rotates the drum gear 211 in the direction of selecting a disk, if an end section of the disk selecting cam groove 210-1 of the drum cam 210 abuts on the nib sections 250-4, 5, 6 of the tray 250, the drum sleeve 212 continues rotating, but the drum cam 210 stops at a predetermined angle and thereafter rotates again. An action observed at this moment is described hereinafter.

Accordingly, the slide plate 137 slidingly moves, and the pick swing cam plate 138 contacting with the abutting section 137-2 of the slide plate 137 slidingly moves while being permitted to move up and down. Further, when the boss 104-4 biases the other end of the link plate 143 by means of rotation of the circular cam plate 104, the ejecting arm 254 rotates clockwise against the bias force of the spring 254-1 as the link plate 143 rotates clockwise, and biases the disk D in the ejection direction.

It should be noted that, in response to an input signal from inputting means such as an operation button or the like, the motor M1 is controlled by a microcomputer operated by a predetermined program. Therefore, for example, when the drum cam 210 is rotated in the direction of selecting a disk, stoppage and activation control of the motor M1 may be used to realize control of stopping the rotation in the direction of selecting a disk for a short amount of time when an end section of the disk selecting cam 210-1 of the drum cam 210 abuts on the nib sections 250-4, 5, 6 of the tray 250 as described above, and then rotating the drum cam 210 in the same direction.

[11. Elevating Mechanism (FIGS. 30, 23 through 25)]

The elevating mechanism for moving the pick chassis 110 and the tray top plate 150 up and down is configured as follows. Specifically, as shown in FIG. 30, a motor M2 as a driving source is provided in the vicinity of the motor M1 in the chassis 101. A two-stage gear 209, which is created by integrally forming a large-diameter gear and a small-diameter gear, is pivotally supported in the chassis 101, wherein the rotary drive power of the motor M2 is transmitted to the large-diameter gear via the speed reduction mechanism.

Figure 23:
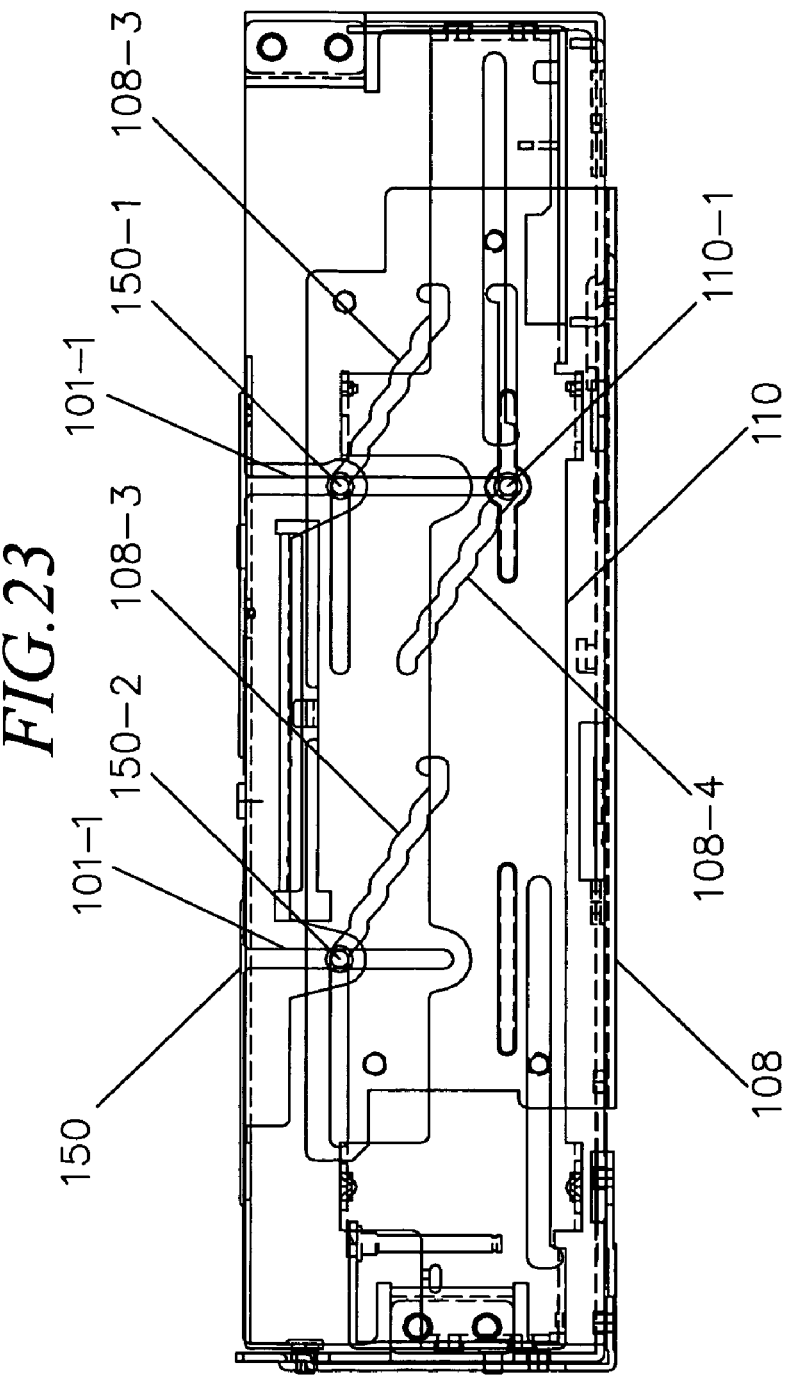
FIG. 23 is a back view showing the chassis and a shift plate of the disk device shown in FIG. 1.
Figure 24:
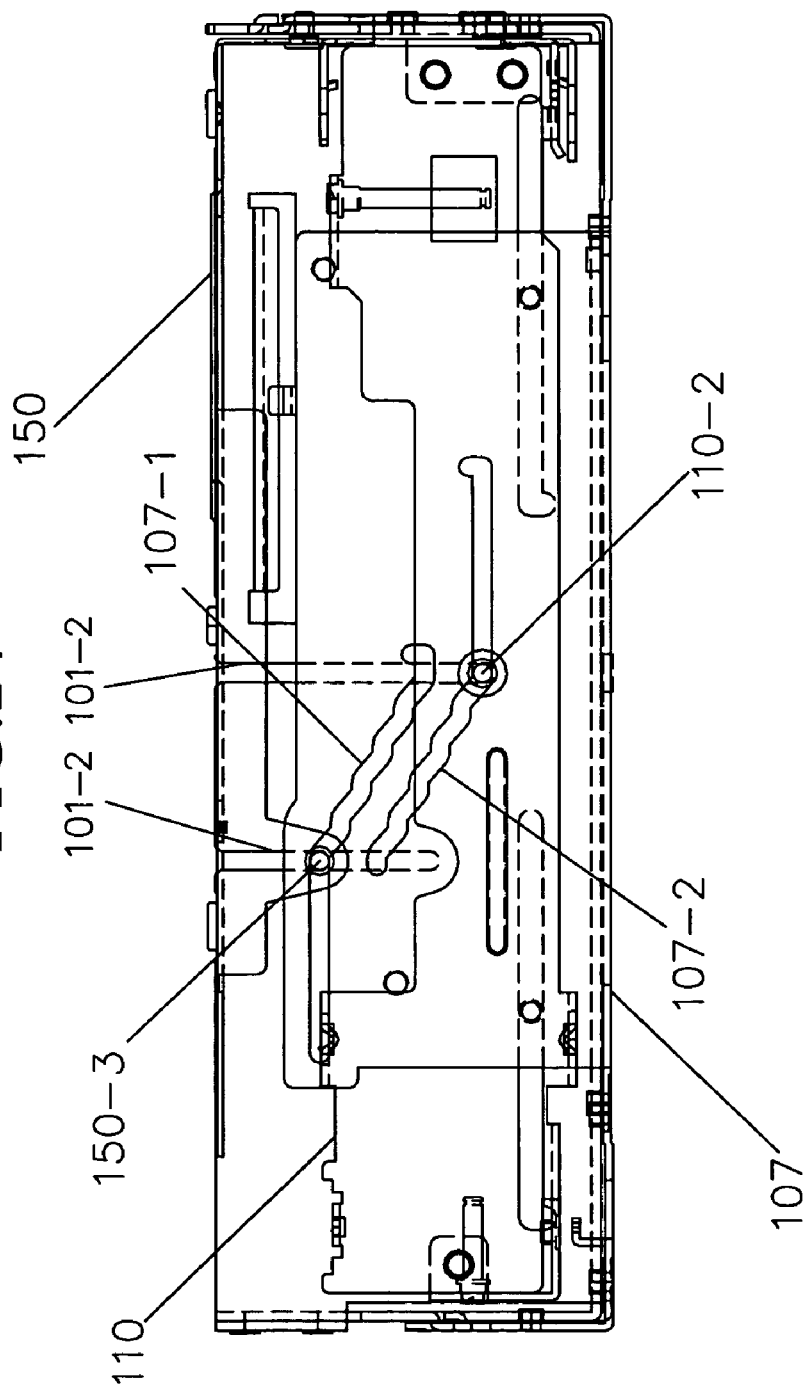
FIG. 24 is a right side view showing the chassis and the shift plate of the disk device shown in FIG. 1.

As shown in FIG. 30 and FIG. 23, a rack 108-1 extending in a longitudinal direction is formed on the shift plate 108, which is formed in the shape of substantially an L from a lower section through the rear section of the chassis 101 and attached slidably to the chassis 101 in the longitudinal direction. This rack 108-1 is engaged with the small-diameter gear of the two-stage gear 209.

As described above, the shift plates 106 through 108 have a function of elevating either the tray top plate 150 or the pick chassis 110 in accordance with the slide movement [of the shift plates 106 through 108]. The member which causes these three shift plates 106 through 108 to slide synchronously is a link arm 109 in the shape of substantially a T shown in FIG. 30. The link arm 109 is pivotally supported rotatably by an engagement between a pivoted hole 109-1 and a pin-like section formed on the lower section of the chassis 101. Pins 109-2, 3, 4 are provided at three leading end sections of this link arm 109.

The pins 109-2, 3, 4 are engaged respectively with grooves 108-6, 107-6, 106-6, which are formed on the shift plates 108, 107, 106. Therefore, when the shift plate 108 moves to the right or left, the link arm 109 rotates counterclockwise or clockwise to bias the shift plate 107 in the anterior-posterior direction and the shift plate 106 in the longitudinal direction.

For example, when operation of selecting a disk is performed, once the shift plate 108 moves to the right from the state shown in FIG. 30, the shift plate 107 moves forward and the shift plate 106 moves to the left. At this moment, the tray top plate 150 and the tray 250 are moved up and down by the step-like part of the top plate elevating cams 108-3, 107-1 formed on the shift plates 106 through 108 respectively, and at the same time the pick chassis 110 is held at the lowest position by the straight section of same. Accordingly, the selected tray 250 can be positioned at the end section of the disk selecting cam groove 210-1 of the drum cam 210.

Further, when performing an operation of playing a disk, once the shift plate 108 moves to the left, the shift plate 107 moves backward and the shift plate 106 moves to the right. At this moment, the pick chassis 110 is moved up and down by the step-like section of the pick elevating cams 108-4, 107-2, 106-2 formed on the shift plates 106 through 108 respectively, and the tray top plate 150 is held at the highest position by the straight section of same.

It should be noted that, as shown in FIG. 32A, a loading roller 401 and a disk guide 230 are disposed in the vicinity of the disk insertion opening 101-7. The loading roller 401 and the disk guide 230 sandwich the disk D to be inserted/ejected, and [the loading roller 401] is rotated by an unshown drive mechanism, whereby insertion/ejection of the disk D is performed.

The above-described up-and-down movement of the pick chassis 110 and the tray top plate 150 is performed by the microcomputer controlling the motor M2, the microcomputer being operated by a predetermined program in response to a detection of a photo-interrupter PI-1 and a switch SW-1. Specifically, as shown in FIG. 30, a plurality of detection holes 106-3 corresponding to a stopped position are formed in the horizontal part of the shift plate 106, and the chassis 101 is provided with the photo-interrupter PI-1 for detecting the detection holes 106-3.

Furthermore, as shown in FIG. 25, a square hole is formed on a corner section of the shift plate 106, and the right edge of the hole functions as a switch driving section 106-4. The position corresponding to the switch driving section 106-4 is provided with the switch SW-1. The switch SW-1 is disposed such that it is ON when the shift plate 106 moves from its position shown in the figure to the right by abutting on or separating from the switch driving section 106-4, and OFF when the shift plate 106 moves from its position shown in FIG. 25 to the left. The shift plate 106 can return to the position in FIG. 25 from any positions by the combination of the switch SW-1 and the photo-interrupter PI-1.

C. Action

Regarding the above-described operation of the present embodiment, the overview of the operation of the disk device is described first and then an operation of selecting a tray 250 and an operation of splitting the trays 250 are described.

[1. Overview of Operation]

First, the overview of the operation of the disk device is described with reference to FIG. 32 and FIG. 33. Specifically, as shown in FIG. 32A, the disk D, which is inserted from the disk insertion opening 101-7, is pulled in by the loading roller 401, passes through between the clamper 125 and the turning table 123 as shown in FIG. 32B, and is then housed in an upper part of each tray 250. When playing the disk D, trays 250 above and below the tray 250 hosing a desired disk D therein are split and caused to withdraw, as shown in FIG. 33A. The drive chassis 120 is swung and caused to enter a space created by causing the trays 250 to withdraw, so that the desired disk D enters between the tuning table 123 and the clamper 125.

Then, as shown in FIG. 33B, the clamp arm 124 is lifted down whereby the disk D is sandwiched between the turning table 123 and the clamper 125. Moreover, the disk D is rotated on the turning table 123 by a spindle motor to read the information [of the disk D] by means of an optical pickup moved by a feed mechanism. It should be noted that splitting and withdrawing the trays 250 as described above are carried out when inserting/ejecting the disk D as described hereinafter.

[2. Selecting a Tray]

An operation of selecting a desired tray 250 in order to play a disk is carried out as follows. Specifically, as shown in FIG. 6, the trays 250 in the initial state are brought close to one another by the bias force of the spring 153. Then, as shown in FIG. 16, the nib sections 250-4, 5, 6 of the trays 250 are located at stand-by positions, that is, at positions which are away from the various cam grooves in the drum cam 210 and in which [the nib sections] can move in the vertical direction (see FIG. 14B).

Furthermore, as shown in FIGS. 18A, 18B and FIG. 19A, the upper edge cam 212-1 and the lower edge cam 212-2 of the drum sleeve 212 are fitted with the restricting sections 110-52, 110-42 of the pick chassis 110, and the drum sleeve 212 is pushed downward by the bias force of the spring 410. Therefore, the protruding section 210-7 of the drum cam 210 enters the permitting section 212-8 of the drum sleeve 212, and the drum cam 210 is in a state of being able to rotate by the width of the permitting section 212-8 with respect to the drum sleeve 212 in a direction opposite to the direction of selecting a disk (Xb direction in FIG. 16).

From this initial state, the motor M2 is activated and the pick chassis 110 is elevated to level the end section of the disk selecting cam groove 210-1 of the drum cam 210 with the nib sections 250-4, 5, 6 of the tray 250 which is the object of selection, as shown in FIG. 16. Then, by activating the motor M1, the ring gear 105 and the drum gear 211 are rotated, and the drum sleeve 212 and the drum cam 210 are rotated in the direction of selecting a disk (Xf direction in FIG. 16).

When the end section of the disk selecting cam groove 210-1 of the drum cam 210 abuts on the nib section 250-4, 5, 6 of the tray 250, the drum sleeve 212 continues rotating, but the drum cam 210 stops at a predetermined angle. At this moment, as described above, the bias force of the spring 410, the restricting section 110-52 of the pick chassis 110, and the upper edge cam 212-1 push the drum sleeve 212 downward (see FIGS. 18A through 18C and FIG. 19A). Moreover, when the drum sleeve 212 rotates, the drum sleeve 212 acts against the spring 410 and is pushed upward by the restricting section 110-42 and the lower edge cam 212-2, and the drum cam 210 and the drum sleeve 212 rotate integrally.

Therefore, even when a height difference occurs between the disk selecting cam groove 210-1 and the tray 250 which is the object of selection and the end section of the disk selecting cam groove 210-1 enters among wrong nib sections 250-4, 5, 6 due to a vibration or other influences, the bias force of the spring 153 tries to return the nib sections 250-4, 5, 6 abutting on the lower leading cam 210-9 to the direction of closing the tray 250 (Y direction in FIG. 16), thus the drum cam 210 is biased by an inclination of the lower leading cam 210-9 and rotates slightly in the Xb direction. Therefore, the end section of the disk selecting cam groove 210-1 moves in a direction of withdrawing from the nib sections 250-4, 5, 6 of a wrong tray 250 and is then removed, and the tray 250 is returned to the normal height by the bias force of the spring 153.

When a correct tray 250 is selected, a tray 250 therebelow is not raised, thus the drum cam 210 abutting on the nib section 250-4, 5, 6 of the tray 250 stops until the protruding section 210-7 of the drum cam 210 hits the left side of the fixing section 212-9 of the drum sleeve 212, as shown in FIG. 19A.

Subsequently to the above-described operation, when the drum gear 211 rotates again in the direction of selecting a disk, the drum sleeve 212 also rotates and the upward bending section 110-5 and the downward bending section 110-4 thereof depart from the restricting section 110-52, 110-42. Consequently, as shown in FIG. 19B, the drum sleeve 212 moves upward against the bias force of the spring 410 and the protruding section 210-7 of the drum cam 210 enters the fixing section 212-9, hence the drum cam 210 rotates in the direction of selecting a disk, along with the drum sleeve 212, and the nib sections 250-4, 5, 6 of the tray 250 (fourth level from the top in FIG. 16), which is the object of selection, enter the disk selecting cam groove 210-1.

Then, the nib sections 250-4, 5, 6 of the tray 250 below the object of selection are caused to abut on the lower leading cam groove 210-9 and pushed downward, and at the same time the nib sections 250-4, 5, 6 of the tray 250 above the object of selection are pushed upward to the upper end section of the drum cam 210. Moreover, the protruding sections 252-1, 253-1 of the holding arm 252 of the tray 250 as the object of selection enter the arm opening/closing cam groove 210-2, and the protruding sections 252-1, 253-1 of the holding arm 252 of the tray 250 below [the object of selection] enter the lower leading cam groove 210-10, thus the holding arm 252 does not rotate (see FIG. 17A). Therefore, as shown in FIG. 3, when the disks D are housed in the trays 250, the holding nibs 252-2, 253-2 of the holding arm 252 keep holding the disks D by means of the bias force of the springs 252-3, 253-3.

[3. Splitting the Trays]

Due to the continuous rotation of the drum cam 210 in the direction of selecting a disk, the step-like disk selecting cam groove 210-1 guides the nub sections 250-4, 5, 6 of the tray 250, which is the object of selection, to the height corresponding the amount of rotation (angle) of the disk selecting cam groove 210-1. Further, upper parts of the nib sections 250-4, 5, 6 of other tray 250 which is not the object of selection are caused to withdraw upward by the upper end section of the drum cam 210 and the lower parts of same are caused to withdraw downward by the lower leading cam groove 210-9, thereby separating from the tray 250 which is the object of selection, in accordance with the rotation amount (angle) of the disk selecting cam groove 210-1.

As shown in FIG. 16, the split amount of the trays 250 is different according to each step of inserting a disk, swinging the pick arm, clamping the disk, releasing the disk, playing the disk, returning the tray, and ejecting the disk. Operation in the each step is described herein.

[3-1. Inserting a Disk]

When housing the disks D in the trays 250, the pick chassis 110 is put on standby at the lowest step and a group of trays 250 are moved up and down, whereby each tray 250 is positioned with respect to the disk insertion opening 101-7. At this moment, split of the trays 250 is carried out through the above-described selecting operation, but since it is not necessary to secure a space for swinging the pick arm 130, the amount of opening of the tray 250, which is the object of selection, and of other trays 250 is small, as shown in FIG. 16.

In the state in which the trays 250 are positioned and split, when a disk D is inserted from the disk insertion opening 101-7, the disk D is pulled in by the loading roller 401 as shown in FIG. 1 and FIG. 2, and caused to abut on the loading arm 256. Consequently, the direction of the disk D is changed, and thereafter the disk D is housed in a selected tray 250.

In the selected tray 250, the holding nibs 252-2, 253-2 of the holding arms 252, 253 are released from the lock holes 254 of the upper tray 250. Therefore, when housing of the disk D in the tray 250 is started, the holding nibs 252-2, 253-2 are biased to the edge of the disk D as shown in FIG. 4, and the holding arm 252 rotates against the bias force of the spring 252-3. Then, as shown in FIG. 3, when the disk D is completely housed in the tray 250, the holding arms 252, 253 are brought back to the original positions by the bias force of the springs 252-3, 253-3, and the holding nibs 252-2, 253-2 hold the edge of the disk D.

In the case where each disk D is housed in each tray 250 as described above, in the section adjacent to the tray 250, the holding nibs 252-2, 253-2 of a lower tray 250 enter the lock holes 254 of the tray 250 above the lower tray 250, as shown in FIG. 5. For this reason, the rotation of the holding arms 252, 253 is regulated and the disk D is prevented from coming out of the tray 250.

[3-2. Swinging the Pick Arm]

When the pick arm 130 is turned and swung to the tray 250, it is necessary to secure spaces for swinging the turning table 123 and clamp arm 124, on the top and bottom of the disk D inside the selected tray 250. Therefore, as shown in FIG. 16, the amount of opening of the upper and lower trays 250 besides the tray 250 as the object of selection becomes the maximum. In this state, the motor M1 is activated and thereby the pick swing cam plate 138 is slidingly moved backward as described above, the pick swing arm 131 and the pick arm 130 are turned as shown in FIG. 1 and FIG. 2, and the clamper 125 and the turning table 123 are swung to the top and bottom of the selected disk D.

[3-3. Clamping the Disk]

Next, when clamping the disk, only the tray 250 as the object of selection is lifted down as shown in FIG. 16, in order to fit the inner diameter of the disk D with the turning table 123. Then, by lifting down the clamp arm 124, the disk D is pressed against the turning table 123 by the clamper 125.

[3-4. Releasing the Disk]

Further, in order to play the disk D which is clamped on the turning table 123, the disk D needs to be released from the tray 250. For this reason, as shown in FIG. 16, the protruding sections 252-1, 253-1 of the holding arm 252 are brought to the groove end T of the arm opening/closing cam groove 210-2 in accordance with rotation of the drum cam 210. Consequently, as shown in FIGS. 17B and 17C, the protruding sections 252-1, 253-1 are biased to the groove end T of the drum cam 210 and the holding arms 252, 253 rotate against the bias force of the springs 252-3, 253-3, thus the holding nibs 252-2, 253-2 release the disk D.

[3-5. Playing the Disk]

When reading a signal of the disk D which is clamped by the clamper 125 and released from the tray 250, the tray 250 needs to be withdrawn from the disk D to be played. For this reason, as shown in FIG. 16, the tray 250 as the object of selection is lifted down in accordance with rotation of the drum cam 210 and separated from the disk D, as shown in FIG. 16.

[3-6. Returning the Tray]

After playing of the disk D is ended, an operation opposite to the one described above is carried out. In other words, the drum cam 210 rotates in the opposite direction, whereby the tray 250 which is the object of selection moves upward and the protruding sections 252-1, 253-1 of the holding arms 252, 253 enter the arm opening/closing cam groove 210-2, hence the holding arms 252, 253 are rotated by the bias force of the springs 252-3, 253-3 and the holding nibs 252-2, 253-2 of the holding arms hold the disk D. Then, the disk D is released from the clamping of the clamper 125, and the pick arm 130 is swung out of the tray 250. In this manner, as the drum cam 210 rotates, the upper and lower trays 250 are moved in the closing direction by the bias force of the springs 152, 153, and the nib sections 250-4, 5, 6 of the trays 250 are released at the standby position, whereby the trays 250 return to the initial state where they are adjacent to one another.

[3-7. Ejecting the Disk]

When ejecting the disk D, positioning of the selected tray 250 and split of the trays 250 are carried out as in the case where the disk is inserted, and thereafter the ejecting arm 254 is rotated, whereby the disk D is pushed out from the tray 250. Then, the loading roller 401 ejects the disk D from the disk insertion opening 101-7 to the outside through an operation opposite to the one performed when inserting the disk, as described above.

D. Effect

According to the present embodiment described above, by rotating the cylindrical drum cam 210, a tray 250 can be selected and split from other trays. Therefore, compared to a camp plate or the like in which securing of a slide stroke and interference between other members have to be considered, only a small space is required and the degree of freedom for disposing other members is high. Moreover, when the drum cam 210 selects a tray 250, even if the nib sections 250-4, 250-5, 250-6 of other tray 250 which is not the object of selection enter the end section of the disk selecting cam groove 210-1, the drum cam 210 can be withdrawn and each position [of the nib sections] can be returned to the original, thus erroneous selection of tray 250 can be prevented. Particularly, even when the trays 250 are displaced by a vibration or the like, [the trays 250] can be automatically returned to the original positions thereof by the springs 152, 153 while the disk selecting cam groove 210-1 of the drum cam 210 is withdrawn. Therefore, a device suitable for, for example, an on-board disk device can be constituted.

The rotation of the drum gear 211 is transmitted to the drum cam 210 by the cylindrical drum sleeve 212 disposed between the drum gear 211 and the drum cam 210, and a rotation of the drum gear 211 for avoiding an erroneous selection can be permitted, thus only an extremely small space is necessary. Moreover, biasing of the drum cam 210 in the direction of selecting a disk and biasing of the drum sleeve 212 downward are realized by the common spring 410, thus the number of parts and the required spaces can be saved significantly.

The drum cam 210 is further provided with the arm opening/closing cam groove 210-2 which opens and closes the holding arms 252, 253 for holding the disk D in the tray 250, thus a simple structure with a small number of parts and required spaces can be realized. Particularly, the holding arms 252, 253 are opened or closed by the step of the groove end T formed inside the arm opening/closing cam groove 210-2, thus an extremely simple configuration is realized and the parts can be produced easily.

The holding arms 252, 253, which are released from the biasing action of the arm opening/closing cam groove 210-2, are automatically returned to the closed position by the springs 252-2, 253-2, thus the disk D is securely prevented from coming out of the tray 250. Moreover, since the disk selecting cam groove 210-1 and the arm opening/closing cam groove 210-2 are adjacent to each other, the biasing positions for the holding arms 252, 253 can be designed easily in accordance with the play position in the disk selecting cam 210-1, and the both holding arms 252, 253 and the disk selecting cam 210-1 can be synchronized easily. In addition, since the disk selecting cam groove 210-1 and the arm opening/closing cam groove 210-2 are formed on the drum cam 210, formation of the disk selecting cam groove 210-1 and the arm opening/closing cam groove 210-2 can be carried out easily, and the tray 250 and the holding arms 252, 253 which are guided thereto are hardly affected by a vibration.

The lock holes 254 for regulating the rotation of the adjacent holding arms 252, 253 are formed on the tray 250 itself which houses the disk D, thus the structure can be simplified, compared to the case where other lock mechanism or the like is provided. Particularly, when the holding arms 252, 253 are in the closed position, the holding nibs 252-2, 253-2 are inserted into the lock holes 254, whereby rotation of the holding arms 252, 253 is regulated, thus the disk D can be prevented from coming out of the tray 250 with an extremely simple structure, and [the tray 250] is hardly affected by a vibration.

When the trays 250 are in the standby state, the trays 250 are automatically brought close to one another by the bias force of the springs 152, 153, thus the holding nibs 252-2, 253-2 are inserted into the lock holes 254 and the holding arms 252, 253 are automatically regulated. Furthermore, after releasing or housing the disk D, the holding arms 252, 253 are automatically brought back to the closed position by the springs 252-3, 253-3. Therefore, locking, cancellation of locking, and rotation can be automatically performed on the holding arms 252, 253 without requiring any special driving source or the like.

E. Other Embodiments

The present invention is not limited to the embodiment described above. For example, the drive mechanism for rotating the drum sleeve and the drum cam is not limited to the one described in the above embodiment, thus any mechanism may apply as long as it can realize a predetermined amount of rotation. Also, the elevating mechanism for moving the pick chassis and the tray top plate up and down is not limited to the one described in the above embodiment, thus any mechanism may apply as long as it can move the pick chassis and the tray top plate up and down to a predetermined position and hold the pick chassis and the tray top plate.

In the above embodiment, out of the trays which are not the object of selection, the upper tray is guided to the upper section of the drum sleeve and the lower tray is guided to the cam grooves. However, the upper tray may be guided to the cam grooves and the lower tray may be guided to the lower section of the drum sleeve, or both upper and lower trays may be guided to the cam grooves.

Regarding the control of rotation of the drum cam when selecting a tray, the rotation is not necessarily stopped temporarily, thus the permitting section, the width of the protrusion inserted therein, the bias force of the spring for biasing the drum cam in the direction of selecting a disk, and the bias force of the spring for biasing the tray in the closing direction may be set so that, when the drum cam rotates in the direction of selecting a disk, it can rotate in the opposite direction and can be withdrawn once from the tray.

It is preferred that the number of drum cams to be disposed be three as described in the above embodiment, but it may be two as long as up-and-down movement can be secured, or it may be four to obtain more stable up-and-down movement. In response to the number of drum cams, the number of protrusions of a tray can be increased or reduced. The shape of the tray is not limited to the one described in the above embodiment, thus any shape applies as long as the tray can be moved up and down by the drum cam.

The arm opening/closing cam, which is formed on the drum cam, may be able to bias the holding arms in a predetermined rotation position of the drum cam, thus a protrusion or ridge for biasing the holding arms may be provided on a part of the outer periphery of the drum cam. The biasing members for biasing the holding arms also are not limited to the springs described above, thus a plate spring or the like may be used, or the holding arm itself may be made of an elastic material which functions as the biasing members.

Movement of the holding arms also is not limited to the rotary movement, thus it may be a slide movement in the direction of approaching or separating from the disk. The regulating section for regulating the rotation of the holding arms of the tray is not limited to the lock hole. For example, it may be a protrusion or ridge which abuts on a side face of the holding nib to regulate the rotation of the holding arm. The shape of the holding nib also is not limited to the shape described in the above embodiment, thus it may be any shape as long as it can hold the edge of the disk.

Although the present invention is suitable for a type of disk device in which the abovementioned drive unit is rotated and swung, the present invention may be applied to a type of disk device in which, for example, the drive unit is slidingly moved without being rotated. Moreover, the present invention is suitable for a disk device in which the top and bottom of the disk are clamped, since the withdrawal space can be secured at the top and bottom of the selected disk. However, the present invention may be applied to a disk device which has a member for holding the inner diameter of a disk on a turning table and does not require a clamper or the like.

Moreover, each member, intervals between the members, distance between the operating members and the like are also arbitrary. Furthermore, although the present invention is suitable for a disk device handling a CD, DVD, or the like, the present invention is not limited to this device, and thus can be applied widely to a flat recording medium. In addition, although the present invention is suitable for an on-board disk device since it is resistant to vibration, [the present invention] is not limited to this device, and thus can be applied to various disk devices of stand-alone type, portable type, and the like.

The invention claimed is:

1. A disk selecting device, comprising:
a plurality of disk holding sections for holding a plurality of disks respectively; and
a disk moving mechanism for separating a disk holding section, which is the object of selection, from other disk holding sections, wherein
the disk moving mechanism comprises:
an axis section which is provided in the vicinity of the disk holding sections and rotated by a drive mechanism;
a cylindrical drum cam into which the axis section is inserted and which is rotated in accordance with the rotation of the axis section;
a disk selecting cam which is formed on a periphery of the drum cam and leads the disk holding section, which is the object of selection, in a direction of separating the disk holding section from other disk holding sections; and
a transmitting section which is provided between the axis section and the drum cam, permits the rotation of the drum cam so that the disk selecting cam is withdrawn from the disk holding sections which are not the object of selection, and transmits drive power from the axis section to the drum cam.

2. The disk selecting device according to claim 1, further comprising a first biasing member which biases the plurality of disk holding sections in a direction in which the holding sections are brought close to one another.

3. The disk selecting device according to claim 1, wherein the transmitting section is a cylindrical drum sleeve into which the axis section is inserted so as to be able to move in an axial direction of the axis section, and the drum sleeve has a fixing section for fixing the drum cam to the axis section in accordance with the position of the movement of the drum sleeve, and a permitting section which can rotate the drum cam independently from the axis section.

4. The disk selecting device according to claim 1, further comprising:
a second biasing member which biases the drum sleeve to a fixing position at which the fixing section fixes the drum cam or a permitting position at which the permitting section permits the rotation of the drum cam; and
a pressing section which presses the drum sleeve in a direction against the second biasing member in accordance with the position of rotation of the drum sleeve, and thereby switches between the fixing position and the permitting position.

5. The disk selecting device according to claim 4, wherein the second biasing member is a spring which is disposed between the drum cam and the drum sleeve and biases the drum cam and the drum sleeve in a direction in which the disk selecting cam contacts with the disk holding section which is the object of selection.

6. The disk selecting device according to claim 1, wherein the disk holding section comprises a holding arm which is provided displaceably between a closed position for contacting with a disk to hold the disk and an opened position for separating from the disk to release the disk, and a periphery of the drum cam is provided with an arm opening/closing cam which biases the holding arm in the disk holding section, which is the object of selection, to the opened position or the closed position.

7. The disk selecting device according to claim 6, further comprising a biasing member which biases the holding arm in a direction opposite to the biasing direction of the arm opening/closing cam.

8. The disk selecting device according to claim 6, wherein the arm opening/closing cam is disposed in the vicinity of the disk selecting cam.

9. The disk selecting device according to claim 6, wherein the arm opening/closing cam comprises a step for switching between whether or not to bias the holding arm.

10. The disk selecting device according to claim 9, wherein the disk selecting cam and the arm opening/closing cam are two rows of grooves having different depths and provided in parallel with each other, and a groove end of the arm opening/closing cam is provided with the step.

11. The disk selecting device according to claim 1, wherein the disk holding sections are disposed in a stacked manner and are provided so as to be able to move up and down individually, and each disk holding section is provided with a holding arm capable of being displaced between a closed position for contacting with a disk to hold the disk and an opened position for separating from the disk to release the disk, and a regulating section which regulates displacement of the holding arm of an adjacent disk holding section.

12. The disk selecting device according to claim 11, wherein the holding aim is provided with a holding nib for holding an outer edge of the disk at the closed position, and the regulating section is a lock hole into which the holding nib is inserted.

13. The disk selecting device according to claim 12, further comprising a first biasing member which biases the plurality of disk holding sections in a direction in which the disk holding sections are brought close to one another.

14. The disk selecting device according to claim 11, further comprising a second biasing member which biases the holding arm to the closed position.

15. The disk selecting device according to claim 11, wherein the periphery of the drum cam is provided with an arm opening/closing cam which biases the holding arm in the disk holding section, which is the object of selection, to the opened position or the closed position.

16. A disk device comprising the disk selecting device described in claim 1, wherein the plurality of disk holding sections are disposed in a stacked manner, the disk device comprising:
  a drive unit which plays a disk released from the disk holding section, which is the object of selection;
  a drive moving mechanism which moves the drive unit to a space foamed by separating the disk holding sections; and
  an elevating mechanism which moves at least the drum cam or disk holding section to a position at which the disk selecting cam and the disk holding section, which is the object of selection, are fitted with each other.

* * * * *